(12) United States Patent
Shiono et al.

(10) Patent No.: US 7,085,203 B2
(45) Date of Patent: Aug. 1, 2006

(54) OPTICAL HEAD WITH DEFOCUSING CORRECTION AND SPHERICAL ABERRATION CORRECTION

(75) Inventors: Teruhiro Shiono, Osaka (JP); Keiichi Matsuzaki, Osaka (JP); Hidenori Wada, Kyoto (JP); Seiji Nishino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 285 days.

(21) Appl. No.: 09/794,434

(22) Filed: Feb. 27, 2001

(65) Prior Publication Data

US 2001/0019528 A1   Sep. 6, 2001

(30) Foreign Application Priority Data

Mar. 3, 2000   (JP)   ............................. 2000-058432

(51) Int. Cl.
  *G11B 7/00*   (2006.01)
(52) U.S. Cl. .............................. 369/44.32; 369/112.08; 369/44.23; 369/53.23
(58) Field of Classification Search ............. 369/44.23, 369/44.32, 53.22, 53.23, 53.28; 359/19
  See application file for complete search history.

(56) References Cited

U.S. PATENT DOCUMENTS

| | | | |
|---|---|---|---|
| 4,533,213 A * | 8/1985 | Washizuka et al. ......... 350/332 |
| 4,679,891 A * | 7/1987 | Roberts ...................... 359/357 |
| 5,204,516 A * | 4/1993 | Opheij ..................... 250/201.5 |
| 5,426,521 A * | 6/1995 | Chen et al. ..................... 359/9 |
| 5,483,332 A * | 1/1996 | Takamiya et al. .......... 356/28.5 |
| 5,504,772 A * | 4/1996 | Deacon et al. .............. 372/102 |
| 5,603,068 A * | 2/1997 | Aihara ....................... 396/287 |
| 5,629,799 A * | 5/1997 | Maruyama et al. ......... 359/565 |
| 5,668,787 A * | 9/1997 | Shigematsu et al. .......... 369/13 |
| 5,691,829 A * | 11/1997 | Fischer et al. .................. 359/7 |
| 5,815,293 A * | 9/1998 | Komma et al. ................ 359/19 |
| 5,880,478 A * | 3/1999 | Bishop et al. ............ 250/505.1 |
| 5,909,322 A * | 6/1999 | Bietry ........................ 359/793 |
| 5,914,822 A * | 6/1999 | Maruyama et al. ......... 359/743 |
| 5,970,082 A * | 10/1999 | Ershov ........................ 372/102 |
| 6,188,710 B1* | 2/2001 | Besaucele et al. ............ 372/60 |
| 6,215,756 B1* | 4/2001 | Shimano et al. ....... 369/112.26 |
| 6,222,624 B1* | 4/2001 | Yonezawa ................ 356/237.1 |

(Continued)

FOREIGN PATENT DOCUMENTS

EP   1 043 615   10/2000

(Continued)

*Primary Examiner*—Gautam R. Patel
(74) *Attorney, Agent, or Firm*—Hamre, Schumann, Mueller & Larson, P.C.

(57) ABSTRACT

An optical head with excellent optical characteristics even when using a light source that substantially has a wavelength broadening is provided. The optical head includes a light source, an objective lens for focusing a light beam emitted from the light source on an information recording medium and a photodetector for detecting the light beam reflected from the information recording medium, wherein defocusing correction means and spherical aberration correction means are provided in an optical path between the light source and the information recording medium. Since both the defocusing correction means and the spherical aberration correction means are provided, while defocusing of a focused spot on the information recording medium caused by a wavelength broadening of the light source and chromatic aberration of the optical system can be corrected, the spherical aberration of the optical system caused by wavelength difference between a design wavelength and an incident wavelength also can be corrected. As a result, excellent optical characteristics can be obtained.

26 Claims, 18 Drawing Sheets

U.S. PATENT DOCUMENTS 6,487,163 B1 * 11/2002 Sugaya et al. ............ 369/275.4
6,510,111 B1 *  1/2003 Matsuura ................. 369/44.32
6,834,036 B1 * 12/2004 Shiono et al. ......... 369/112.03

FOREIGN PATENT DOCUMENTS

JP       2000-131603      5/2000

* cited by examiner (a)

(b)

(a) λ =405nm (b) λ =415nm (c) λ =395nm

OPTICAL HEAD WITH DEFOCUSING CORRECTION AND SPHERICAL ABERRATION CORRECTION

FIELD OF THE INVENTION

The present invention relates to an optical head used for an optical recording/reproduction device. In particular, the present invention relates to an optical head with excellent optical characteristics even when using a light source that substantially has a wavelength broadening.

BACKGROUND OF THE INVENTION

As an important component part for reading out signals from optical recording media such as optical discs, e.g. compact discs (CD), DVD etc., optical card memories or the like, an optical head is available. In order to take out signals from the optical recording media, the optical head needs to be equipped not only with a signal detection function but also with a control mechanism such as a focusing servo, a tracking servo and the like.

The optical head usually includes various optical components such as a light source, a photodetector, an objective lens, a focus/tracking error signal detecting element, a mirror, a collimator lens etc. A laser beam emitted from a light source is focused on an optical disc by an objective lens (collective lens). The laser beam focused on the optical disc is reflected and detected by a photodetector. In this way, a reproduction signal is read out. Moreover, focusing and tracking are controlled by a focus/tracking error signal detecting element, so that signals can be read out stably.

However, in the case of a light source that has a wavelength broadening such as a semiconductor laser source to which high frequency current superposition is applied, due to chromatic aberration (in particular, mainly due to color dispersion of a glass material) of the optical system including the objective lens, defocusing of a focused spot on the information recording medium was likely to occur according to the degree of wavelength broadening.

SUMMARY OF THE INVENTION

It is an object of the present invention to solve the conventional problem described above by providing an optical head that is capable of obtaining excellent optical characteristics according to its configuration in which both defocusing correction means and spherical aberration correction means and provided. Thus, while defocusing of a focused spot on an information recording medium caused by a wavelength broadening of a light source and chromatic aberration of an objective lens can be corrected, spherical aberration of the optical system caused by wavelength difference between a design wavelength and an incident wavelength also can be corrected, and furthermore, if necessary, spherical aberration caused by an error in a standard thickness of a base material of the information recording medium can be corrected.

In order to achieve the above object, the optical head of the present invention includes a light source, an objective lens for focusing a light beam emitted from the light source on an information recording medium and a photodetector for detecting the light beam reflected from the information recording medium, wherein defocusing correction means and spherical aberration correction means are provided in an optical path between the light source and the information recording medium. In the optical head described above, according to the configuration in which both the defocusing correction means and the spherical aberration correction means are provided, while defocusing of a focused spot on the information recording medium caused by a wavelength broadening of the light source and chromatic aberration of the objective lens can be corrected, spherical aberration of the optical system caused by wavelength difference between a design wavelength and an incident wavelength also can be corrected, and furthermore, if necessary, spherical aberration caused by an error in a standard thickness of a base material of the information recording medium can be corrected. As a result, excellent optical characteristics can be obtained.

In the optical head described above, the light source preferably has a wavelength broadening in which a full width at half maximum of a wavelength is substantially 0.3 nm or more. When the light source has a wavelength broadening of such a range, defocusing is likely to occur on the information recording medium, thereby degrading the focused spot. Therefore, the effect of the present invention is more significant.

Furthermore, it is preferable that the above wavelength $\lambda$ satisfies a relationship of $0.3 \ \mu m \leq \lambda \leq 0.5 \ \mu m$. When the wavelength is within such a range, the occurrence of defocusing and the amount of spherical aberration caused by the wavelength deviation is increased even more, and signals on the information recording medium may not be read out easily. Therefore, the effect of the present invention is more significant.

Moreover, it is preferable that the defocusing correction means substantially corrects defocusing of a focused spot on the information recording medium caused by a wavelength broadening of the light source and chromatic aberration of the objective lens. According to the optical head described above, defocusing caused by the objective lens, which is the main factor for the defocusing of the focused spot, can be corrected, so that excellent optical characteristics can be obtained.

Furthermore, it is preferable that the optical head of the present invention further includes a collimator lens positioned between the light source and the objective lens in an optical path for substantially collimating the light beam emitted from the light source, and that the defocusing correction means substantially corrects defocusing of a focused spot on the information recording medium caused by a wavelength broadening of the light source and chromatic aberration of an optical system including the objective lens and the collimator lens. According to the optical head described above, defocusing of the focused spot can be corrected more surely.

Moreover, it is preferable that a lens group including the defocusing correction means and the collimator lens substantially collimates the light beam emitted from the light source and substantially corrects the defocusing. According to the optical head described above, the lens group can substantially correct the chromatic aberration not only of the objective lens but also of the entire optical system including the collimator lens. Therefore, it is unnecessary to provide separate correction means of chromatic aberration for the objective lens. As a result, the configuration of the objective lens can be simplified, and an optical head that is thinner in the height direction can be obtained.

Furthermore, the defocusing correction means preferably is a diffractive optical element. According to the optical head described above, the chromatic aberration can be eliminated by combining the diffractive optical element and the objective lens, and thus, a thinner and lighter optical head can be obtained, compared to the configuration of eliminating the chromatic aberration by using only refractive optical elements.

Furthermore, the diffractive optical element preferably is a convex diffractive optical lens. According to the optical head described above, the chromatic aberration can be eliminated by combining the convex diffractive optical lens and the objective lens, that is, by combining lenses that are both convex lenses. Therefore, the numerical aperture of the collective lens for focusing the beam on the information recording medium can be shared between the objective lens and the defocusing correction element. Thus, the numerical aperture of the objective lens can be suppressed.

Moreover, the defocusing correction means preferably is an afocal optical element.

Furthermore, it is preferable that the afocal optical element has staircase steps with a step size L1, and that the step size L1 substantially satisfies L1=m λ/(n−1), where λ is a wavelength, n is a refractive index of a material of the optical element and m is an arbitrary integer.

Moreover, the afocal optical element preferably is a combined lens of convex and concave types. According to the optical head described above, the optical loss can be reduced.

Furthermore, the defocusing correction means preferably is a combined lens of concave and convex types that are both refractive optical elements.

Moreover, it is preferable that the spherical aberration correction means substantially corrects the spherical aberration of the objective lens and the defocusing correction means caused by wavelength difference between a design wavelength and an incident wavelength. According to the optical head described above, the spherical aberration caused by the objective lens, which is the main factor of the spherical aberration caused by the wavelength deviation, can be corrected, so that excellent optical characteristics can be obtained.

Furthermore, it is preferable that the optical head of the present invention further includes a collimator lens positioned between the light source and the objective lens in an optical path for substantially collimating the light beam emitted from the light source, and that the spherical aberration correction means substantially corrects the spherical aberration of the optical system including the objective lens and the collimator lens and the defocusing correction means caused by wavelength difference between a design wavelength and an incident wavelength. According to the optical head described above, the spherical aberration caused by the wavelength deviation can be corrected more surely.

Furthermore, it is preferable that the spherical aberration correction means substantially corrects the spherical aberration caused by an error in a standard thickness of a base material of the information recording medium. According to the optical head described above, the spherical aberration caused by an error in a standard thickness of a base material of the information recording medium can be corrected in addition to the correction of the spherical aberration caused by the wavelength deviation. As a result, even more excellent optical characteristics can be obtained.

Moreover, the spherical aberration correction means preferably is made of a liquid crystal element in which a refractive index distribution is changeable. According to the optical head described above, the phase distribution can be determined according to the wavelength change, so that the spherical aberration can be corrected excellently.

Moreover, the liquid crystal element preferably has 4 or more segmented areas electrically divided in the radial direction. According to the optical head described above, by changing the amount of electric potential to be applied to each of the segmented portions according to the wavelength change, the spherical aberration can be corrected. Also, by providing 4 or more segmented areas, the value of the spherical aberration can be reduced to half or less.

Furthermore, it is preferable that a numerical aperture of a collective lens for focusing a light beam on the information recording medium is shared between the objective lens and the defocusing correction means. According to the optical head described above, the numerical aperture of the objective lens can be suppressed, so that the objective lens can be manufactured easily.

Furthermore, it is preferable that the defocusing correction means is a convex diffractive optical lens, and that a numerical aperture of the objective lens is in the range between 8 times to 20 times higher than a numerical aperture of the diffractive optical lens.

Furthermore, the objective lens preferably includes 2 or more lenses. According to the optical head described above, the numerical aperture can be increased easily.

Moreover, a numerical aperture of the objective lens preferably is 0.55 or higher.

Furthermore, it is preferable that the objective lens includes 2 or more lenses, and that the numerical aperture thereof is 0.65 or higher. As the numerical aperture is increased, defocusing is more likely to occur, so that the effect of defocusing correction is more significant.

Furthermore, it is preferable that the defocusing correction means and the spherical aberration correction means are integrated. According to the optical head described above, the defocusing correction means and the spherical aberration correction means can be formed as one component. As a result, a thinner device can be manufactured, and position adjustment is no longer necessary.

Moreover, it is preferable that at least one selected from the defocusing correction means and the spherical aberration correction means is driven integrally with the objective lens by an actuator. According to the optical head described above, the optical axis of the objective lens matches at least one of the optical axes of the defocusing correction means and the spherical correction means in the driven state, so that excellent optical characteristics can be obtained.

BRIEF DESCRIPTION OF THE DRAWINGS

FIG. 3(*b*) is a plan view of a defocusing correction element in an optical head according to Embodiment 1 of the present invention.

FIG. 5(b) is a phase distribution chart of a spherical aberration correction element at the time when an incident wavelength is increased from a design wavelength in an optical head according to Embodiment 1 of the present invention.

FIG. 5(c) is a phase distribution chart of a spherical aberration correction element at the time when an incident wavelength is reduced from a design wavelength in an optical head according to Embodiment 1 of the present invention.

DETAILED DESCRIPTION OF THE INVENTION

EMBODIMENT 1

First, an optical head according to Embodiment 1 of the present invention will be explained in detail by using FIG. 1 to FIG. 5 and by determining the coordinate axis as illustrated in each drawing.

Figure 1:
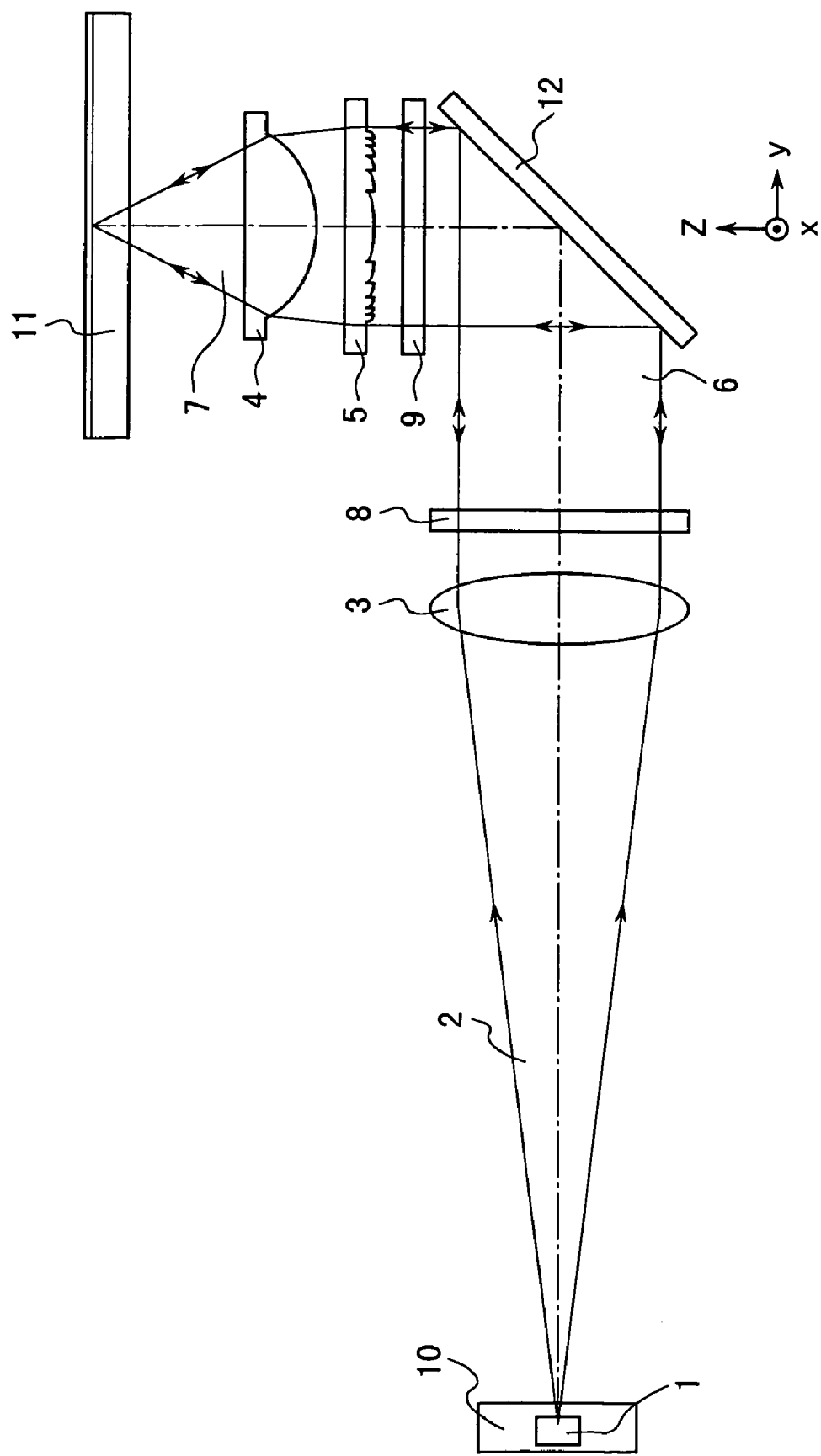
FIG. 1 is a side view showing the basic structure of an optical head according to Embodiment 1 of the present invention and how a light beam is propagated.

FIG. 1 is a side view showing the basic structure of the optical head according to Embodiment 1 of the present invention and how a light beam is propagated.

As illustrated in FIG. 1, on an optical path from a light source 1 to an information recording medium 11, which is an optical disc such as DVD, CD etc., an objective lens 4, a defocusing correction element 5 as defocusing correction means, a spherical aberration correction element 9 as spherical aberration correction means, a mirror 12, a focus/tracking error signal detecting element 8 and a collimator lens 3 are arranged.

The light source 1 is a light source having a substantially wavelength broadening. This light source 1 is, for example, a light source with a wavelength of 405 nm, which is integrated together with a photodetector (not shown) inside a light source/photodetector unit 10. In the present embodiment, as the light source 1, a semiconductor laser to which high frequency current superposition is applied is used.

An emitted beam 2, which is a laser beam emitted in the y-axis direction from a semiconductor laser, i.e. the light source 1, is changed to a substantially parallel beam 6 of, for example, 4 mm in beam diameter by the collimator lens 3 and is transmitted through a diffraction-type focus/tracking error signal detecting element 8 (using the zero-order diffracted light), and the optical path is deflected in the z-axis direction by the mirror 12. Then, the laser beam 6 deflected in the z-axis direction passes through the spherical aberration correction element 9 and the defocusing correction element 5 and is focused (a convergent beam 7) on the information recording medium 11 by the objective lens 4.

The laser beam 7 reflected by the information recording medium 11 is deflected in the opposite direction and passes through the objective lens 4, the defocusing correction element 5, and the spherical aberration correction element 9 and the mirror 12 in order. Then, the laser beam is divided by the diffraction-type focus/tracking error signal detecting element 8 (using the first-order diffracted light) and focused on the photodetector by the collimator lens 3 for detecting signals.

Figure 2:
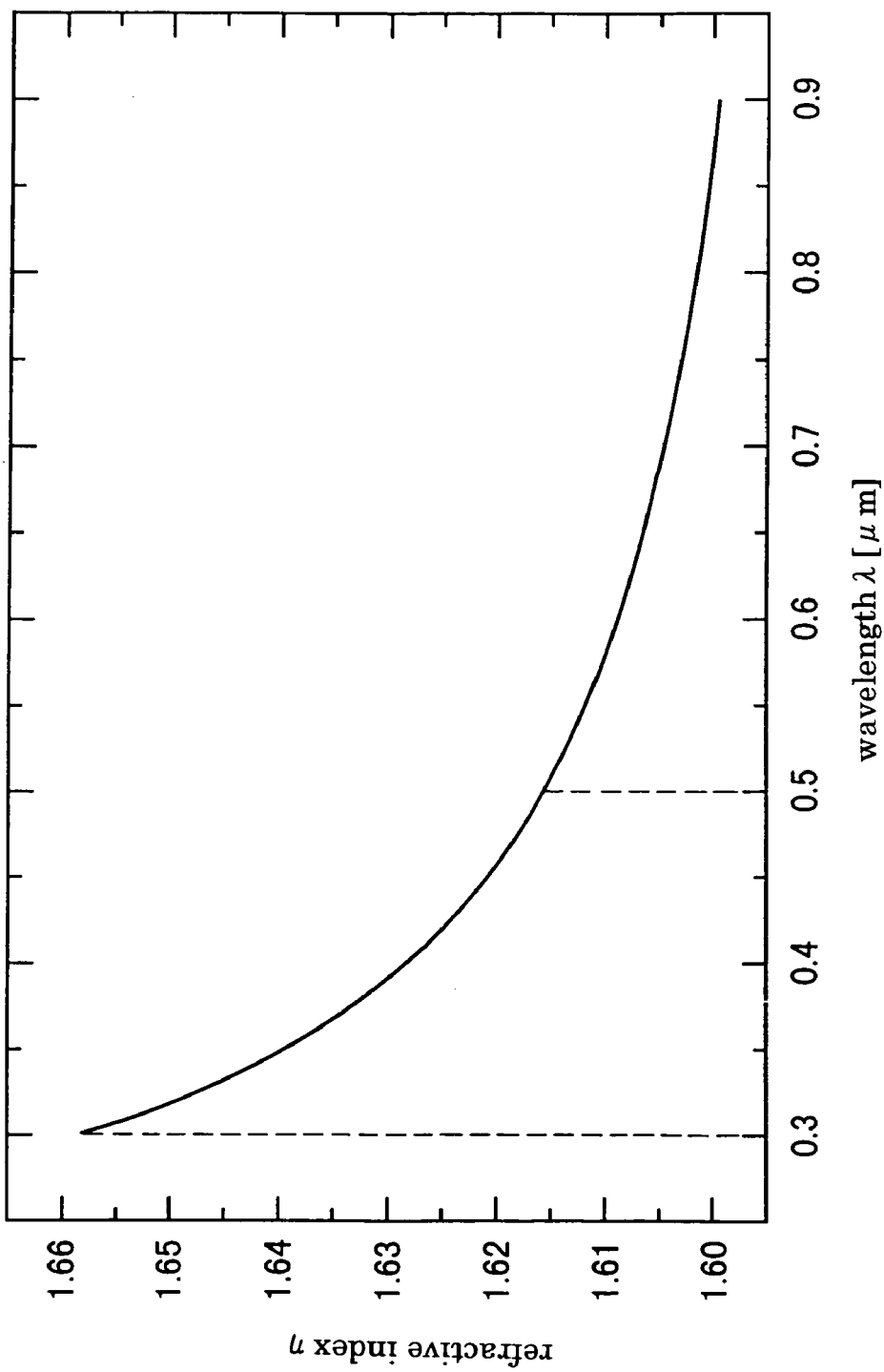
FIG. 2 is a graph showing the relationship between a refractive index and a wavelength of a glass material for forming an objective lens etc. of an optical head according to Embodiment 1 of the present invention.

FIG. 2 is a graph showing the relationship between a refractive index and a wavelength of a glass material for forming the objective lens etc. in the optical head of the present embodiment. In the present embodiment, for reducing noise caused by the return beam, high frequency superposition is applied to the light source 1 of the semiconductor laser, and as a result, a full width at half maximum of the wavelength is broadened. It is clear from FIG. 2 that, with regard to the glass material for forming the objective lens 4 and the collimator lens 3, the refractive index thereof is dependent on the wavelength. Therefore, when the light source 1 has a wavelength broadening, because of this wavelength broadening and chromatic aberration of the lenses, a focal distance of the lens corresponding to each wavelength is changed. In other words, considering the entire wavelength of the light source 1, when the wavelength differs, the focal point is also shifted. As a result, there was a phenomenon that defocusing was likely to occur in the focused spot on the information recording medium 11. In addition, FIG. 2 shows an example in which VC79 was used as the glass material, but the same change can be observed by using other glass materials.

Figure 3:
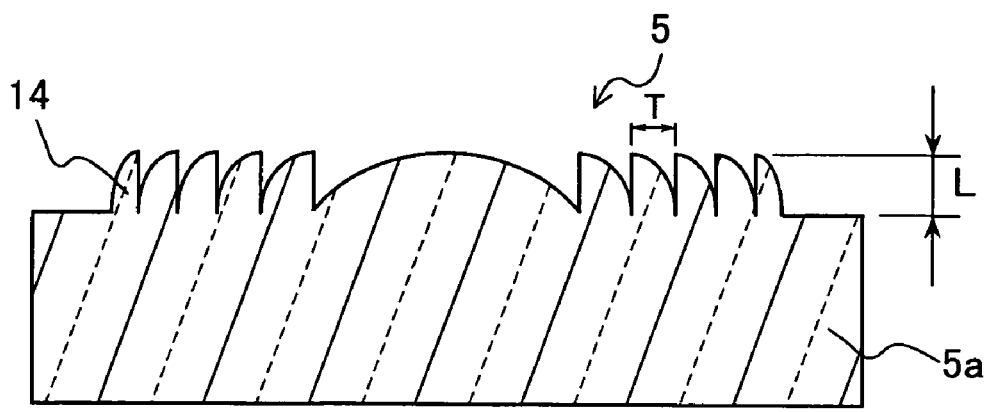
FIG. 3(*a*) is a cross-sectional view of a defocusing correction element in an optical head according to Embodiment 1 of the present invention.
Figure 3:
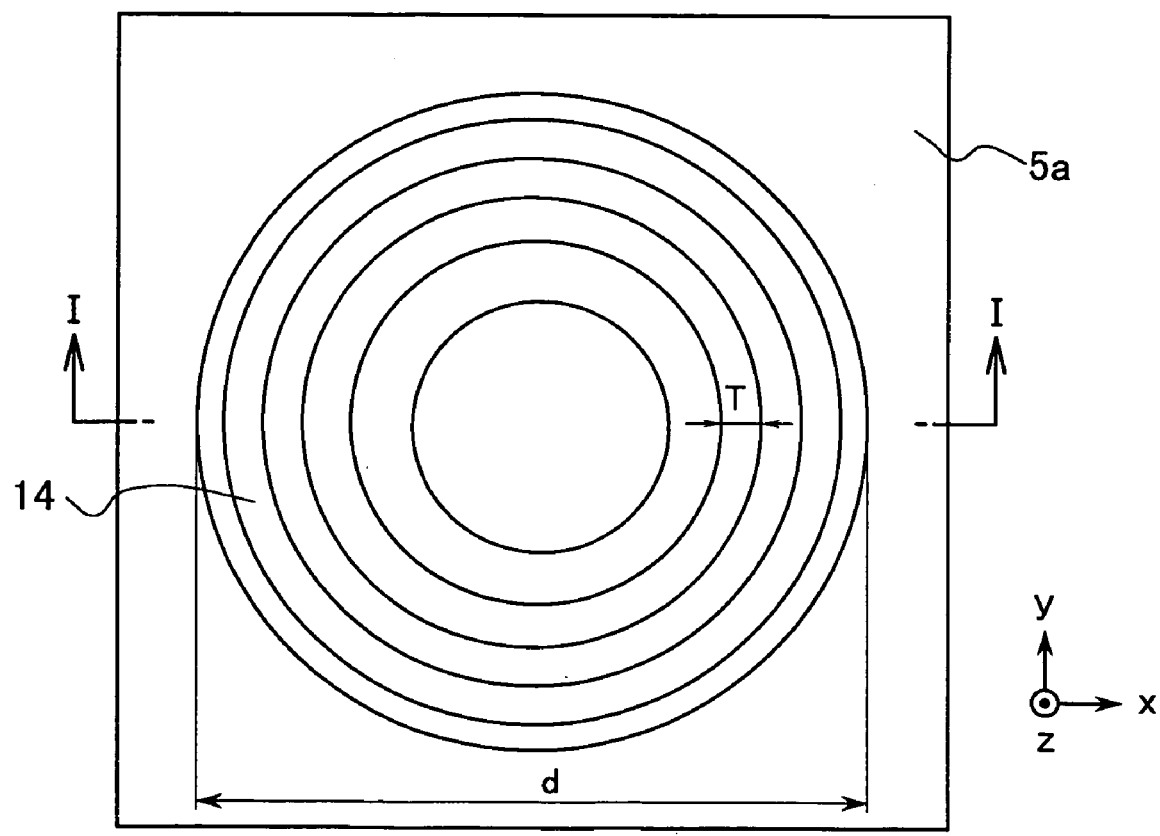

For prevention of the defocusing described above, as illustrated in FIG. 1, the present invention uses the defocusing correction element 5, which is shown in detail in FIG. 3. FIG. 3(b) is a plan view of the defocusing correction element 5, and FIG. 3(a) is a cross-sectional view taken on line I—I of FIG. 3(b). The defocusing correction element 5 is, as illustrated in FIG. 3, a convex diffractive optical lens having a saw-tooth shaped portion 14 formed on a glass substrate 5a.

This defocusing correction element 5 is used in combination with the objective lens 4 and is configured to eliminate the chromatic aberration (achromatism) of the objective lens 4. In other words, the defocusing correction element 5 has a correction ability of such a degree that the defocusing of the focused spot on the information recording medium 11 caused by the wavelength broadening of the light source 1 and the chromatic aberration of the objective lens 4 can be corrected substantially. In addition, "to correct substantially" does not only mean "to correct completely", but the meaning of "to correct to such a degree that there is no problem in practical use" is included herein (the same applies to the following).

One example of the defocusing correction element 5 is configured to have a diameter d of 4 mm, a numerical aperture (NA) of about 0.05, a groove depth L of 0.8 μm and a period T that is reduced gradually towards the periphery (for example, the utmost peripheral period of 8 μm). When the groove depth L is determined to satisfy $L=2\lambda/(n-1)$ substantially, where a central wavelength of the light source 1 is $\lambda$ and a refractive index of the material of the defocusing correction element 5 is n, high diffraction efficiency can be obtained.

As described above, in the present embodiment, a diffractive optical element is used as the defocusing correction element 5, and a convex diffractive optical lens is used as this diffractive optical element. In other words, by combining the convex diffractive optical lens and the convex objective lens 4, achromatism can be achieved. In order to achieve such achromatism only by refractive optical elements, a concave lens can be used in combination with a convex lens.

According to the present embodiment, compared to the configuration achieving achromatism only by refractive optical elements, a thinner and lighter optical head can be obtained.

Furthermore, since achromatism can be achieved by combining the defocusing correction element 5 and the objective lens 4 in this way, that is, by combining both convex lenses, the NA of the collective lens for focusing the beam on the information recording medium 11 can be shared between the objective lens 4 and the defocusing correction element 5.

For example, in the present embodiment, the NA of the objective lens 4 is determined as 0.6, and the NA of the defocusing correction element 5 is determined as 0.05, so that the NA is 0.65 in total. As the NA of the objective lens 4 is increased, it is more difficult to mold the lens, but by sharing the NA in this way, the objective lens 4 can be manufactured more easily. In addition, although it differs according to the glass material used for the objective lens 4, in the case where the achromatic conditions are satisfied, the NA of the objective lens 4 is in the range of about 8 times to 20 times higher than the NA of the diffractive optical lens 5.

Furthermore, other than the objective lens 4, the collimator lens 3 etc. also are used as the optical system, so that the defocusing correction element 5 more preferably is configured to correct not only the chromatic aberration of the objective lens 4 but also to substantially correct the chromatic aberration of the entire optical system including the collimator lens 3 and so forth. This configuration can be realized by providing the defocusing correction element 5 with a correction ability of such a degree that the chromatic aberration of the entire optical system can be corrected substantially.

Moreover, in the case of using the defocusing correction means as described above, the present inventors found out that, when the wavelength of the light source was changed, for example, by about ±10 nm according to an environmental temperature, spherical aberration was more likely to occur.

The reason for this phenomenon was examined intensively, and as a result, it became clear that, also with regard to the occurrence of such spherical aberration, the main factor is the fact that the refractive index of the glass material is dependent on the wavelength as illustrated in FIG. 2. Moreover, it became clear that, in the case of using the defocusing correction element 5 as illustrated in FIG. 1, when the wavelength of the light source 1 is changed, the value of the spherical aberration is increased by about 1.2 to 1.7 times higher than the value obtained in the case where the defocusing correction element 5 is not used.

Figure 4:
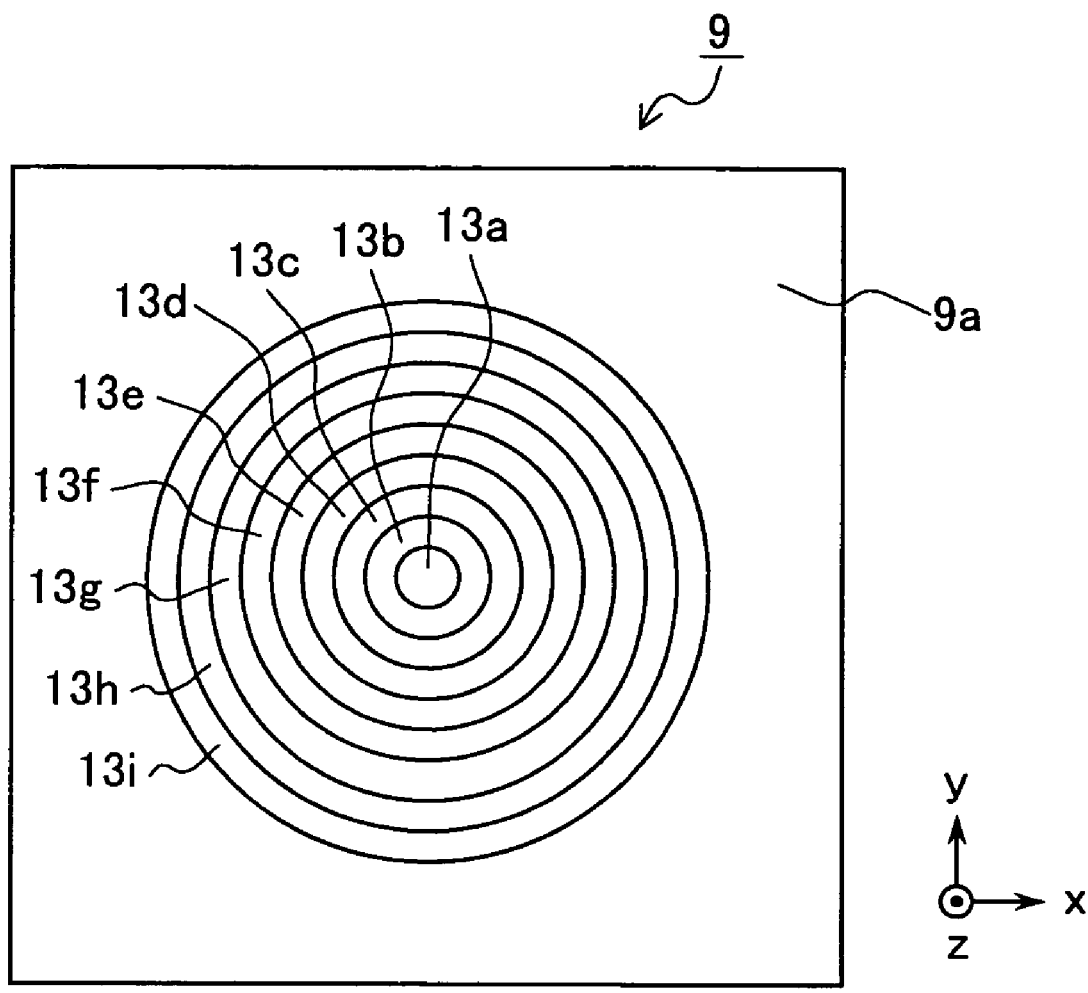
FIG. 4 is a plan view of a spherical aberration correction element of an optical head according to Embodiment 1 of the present invention.

For prevention of such spherical aberration, the spherical aberration correction element 9 is used in the present embodiment as illustrated in FIG. 1, and the details thereof are shown in FIG. 4. FIG. 4 is a plan view showing one example of a spherical aberration correction element. The spherical aberration correction element 9 shown in FIG. 4 is made of a liquid crystal element in which a refractive index distribution is changeable, and the liquid crystal is held between glass plates.

More specifically, a glass substrate 9a has a plurality of transparent segmented electrodes 13a to 13i arranged in concentric circles, and 4 or more segmented areas electrically divided in the radial direction (9 divisions in the example shown in FIG. 4) are provided. When an electric potential is applied to each of the transparent segmented electrodes 13a to 13i, a refractive index of the liquid crystal is changed according to the amount of electric potential, which is realized as a phase distribution.

Figure 5:
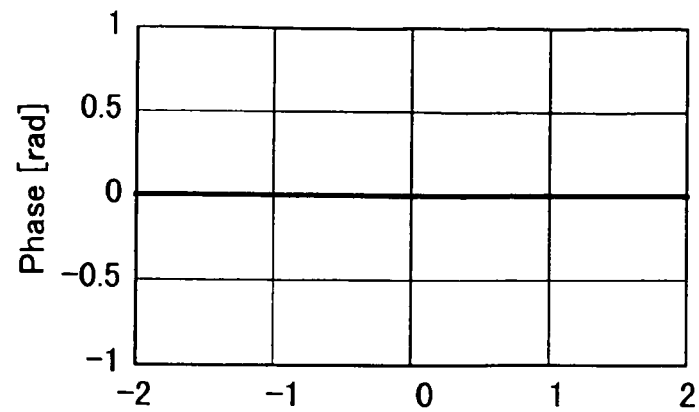
FIG. 5(*a*) is a phase distribution chart of a spherical aberration correction element at the time when an incident wavelength is a design wavelength in an optical head according to Embodiment 1 of the present invention.
Figure 5:
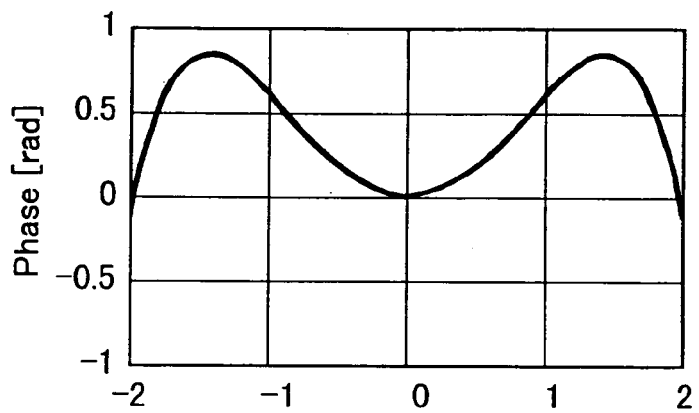
Figure 5:
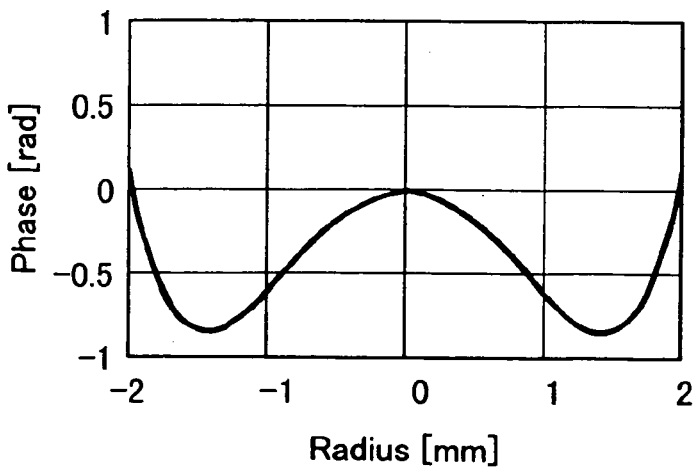

FIG. 5 shows phase distribution charts of the spherical aberration correction element 9 at the time when an incident wavelength was changed. When the wavelength of the light source 1 is a design wavelength of, for example, $\lambda=405$ nm, spherical aberration due to wavelength deviation does not occur, so that the phase amount is 0 throughout the entire area as shown in FIG. 5(a). In this case, it is fine that there is no difference in the electrical potential between the respective transparent segmented electrodes 13a to 13i.

However, when the wavelength was increased by 10 nm to $\lambda=415$ nm, the amount of spherical aberration was changed from 0, for example, to -45 m $\lambda$. Therefore, a different electric potential was applied to each of the transparent segmented electrodes 13a to 13i so that the phase distribution formed two crests with, for example, the maximum values of around 0.5 to 1 rad as illustrated in FIG. 5(b). In this way, the amount of spherical aberration was reduced. In this case, the amount of change in the spherical aberration amount was calculated by the detection mechanism of the spherical aberration amount. When the amount of spherical aberration changes from zero, the amount of change is calculated by the detection mechanism, and a phase distribution is formed according to this amount of change.

Next, when the wavelength was reduced by 10 nm to $\lambda=395$ nm, the amount of spherical aberration was changed, for example, to 46 m $\lambda$, Therefore, a different electric potential was applied to each of the transparent segmented electrodes 13a to 13i so that the phase distribution formed two troughs with, for example, the minimum values of around 0.5 to 1 rad as illustrated in FIG. 5(c). In this way, the amount of spherical aberration was reduced as in the case where the wavelength was increased. As described above, when the wavelength was changed and the spherical aberration occurred, by changing the amount of electric potential to be applied to each of the transparent segmented electrodes 13a to 13i in accordance with the wavelength change, the spherical aberration could be corrected substantially almost to a degree of excellence.

The phase distributions illustrated in FIGS. 5B, 5C show ideal cases. In the present embodiment, the transparent segmented electrodes 13a to 13i are used, so that the phase distributions of FIGS. 5B, 5C are realized by approximating stepwise. In order to improve the degree of approximation, it is preferable to increase the divided number of the transparent segmented electrodes and to finely control an electric potential to be applied in accordance therewith. However, it became clear that, by electrically dividing it into 4 or more segments (four-segmented electrodes) in the radial direction, the value of the spherical aberration can be reduced to half or less.

As described above, according to the present embodiment, both the defocusing correction means 5 and the spherical aberration correction means 9 are provided. Therefore, while the defocusing of a focused spot on the information recording medium 11 caused by the wavelength broadening of the light source 1 and the chromatic aberration of the optical system can be corrected substantially, the spherical aberration of the optical system caused by the wavelength difference between the design wavelength and the incident wavelength also can be corrected substantially. As a result, excellent optical characteristics can be obtained.

In particular, in the case where the wavelength broadening is such that the full width at half maximum of the wavelength is substantially 0.3 nm or larger, it is likely that defocusing occurs, thereby degrading the focused spot. Therefore, the effect of this aspect of the present invention is more significant. Furthermore, as illustrated in FIG. 2, when the wavelength $\lambda$ is within the range of 0.3 $\mu m \leq \lambda \leq 0.5$ $\mu m$, the refractive index change is larger. In other words, within such a range, the refractive index is changed greatly due to a slight change of the wavelength, compared to the range of $\lambda > 0.5$ $\mu m$. Thus, it became clear that, within such a range, the occurrence of defocusing and the amount of spherical aberration caused by the wavelength deviation were increased even more, and that signals on the information recording medium 11 may not be read out easily. Therefore, the effect of the present invention is more significant when the wavelength $\lambda$ is in the range of 0.3 $\mu m \leq \lambda \leq 0.5$ $\mu m$. This wavelength range is rounded off to one decimal places, so that 0.25 $\mu m$ and 0.54 $\mu m$ also are included within this wavelength range.

Furthermore, as the NA of the collective lens (in this embodiment, the combined lens of the objective lens 4 and the defocusing correction element 5) for focusing the beam on the information recording medium 11 is increased, defocusing is more likely to occur. Therefore, the effect of the present invention in this case also was more significant. Particularly, it was effective when the NA was 0.55 or higher.

In addition, elements other than the objective lens 4, the collimator lens 3 etc. also are used as the optical system, so that the spherical aberration correction element 9 more preferably is configured to correct not only the spherical aberration of the objective lens 4 but also to substantially correct the spherical aberration caused by the displacement between the design wavelength and the incident wavelength of the entire optical system including the collimator lens 3 and so forth. This configuration can be realized by determining the phase distribution of the spherical aberration correction element 9 such that the spherical aberration of the entire optical system can be corrected substantially.

Moreover, in the present embodiment, the defocusing correction element 5, the spherical aberration correction element 9 and the objective lens 4 were driven integrally by an actuator. According to this configuration, the three elements can be driven while the optical axes thereof are matched, so that excellent optical characteristics can be obtained. In addition, by driving either the defocusing correction element 5 or the spherical aberration correction element 9 with the objective lens 4 integrally with an actuator, such effect can be obtained to some degree.

Furthermore, the phase distribution of the spherical aberration correction means 9 can be determined such that not only the spherical aberration caused by the wavelength deviation of the light source itself is corrected, but also the spherical aberration caused by a manufacturing error of a base material thickness of the information recording medium 11 (for example, a manufacturing error in a design value of 0.6 mm) also is corrected substantially. By forming such a phase distribution, the optical characteristics can be improved even more.

Furthermore, in the present embodiment, the spherical aberration correction element 9 and the defocusing correction element 5 are arranged as illustrated in FIG. 1, but the arrangement is not limited hereto. Both elements may be positioned in the optical path between the information recording medium 11 and the light source 1. Moreover, by using the objective lens 4 in the arrangement of a finite system, the collimator lens 3 may be omitted.

Furthermore, the defocusing correction element 5 made of a diffractive optical element may be positioned to face the opposite direction of the direction described in this embodiment. In addition, the collimator lens 3 and the focus/tracking error signal detecting element 8 may be positioned in the reverse order.

EMBODIMENT 2

Figure 6:
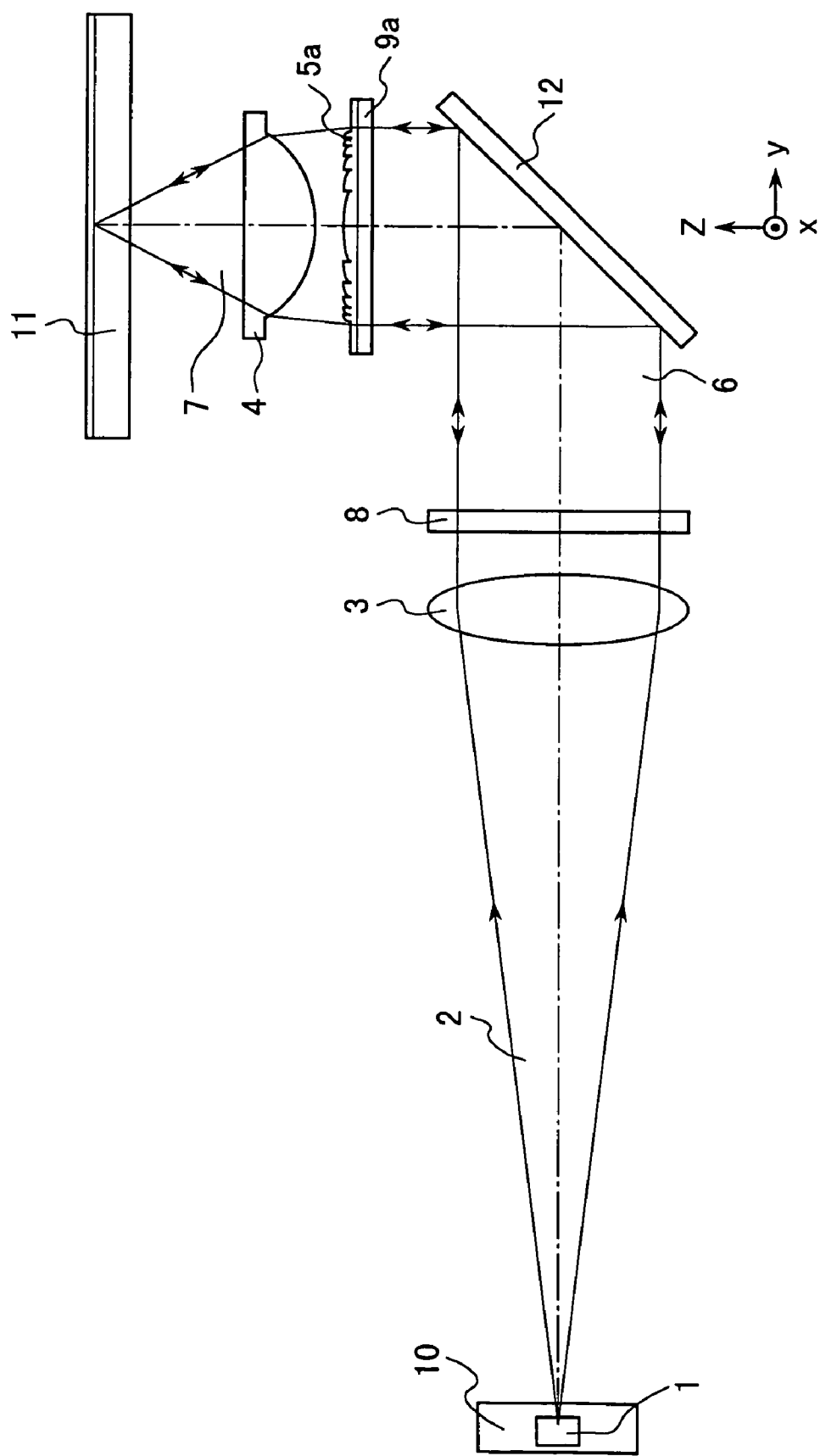
FIG. 6 is a side view showing the basic structure of an optical head according to Embodiment 2 of the present invention and how a light beam is propagated.

Next, an optical head in Embodiment 2 of the present invention will be explained with reference to FIG. 6 by mainly referring to the point that is different from Embodiment 1 described above. FIG. 6 is a side view showing the basic structure of the optical head according to Embodiment 2 of the present invention and how a light beam is propagated.

According to the configuration of the optical head in the present embodiment, the defocusing correction element 5a, which is defocusing correction means, and the spherical aberration correction element 9a, which is spherical aberration correction means, are integrated. By forming the defocusing correction element 5a on top of the spherical aberration correction element 9a, the defocusing correction means and the spherical aberration correction means can be formed as one component. As a result, a thinner device can be manufactured, and position adjustment is no longer necessary.

Furthermore, the defocusing correction element 5a and the spherical aberration correction element 9a may be positioned in the reverse of the case illustrated in FIG. 6.

EMBODIMENT 3

Figure 7:
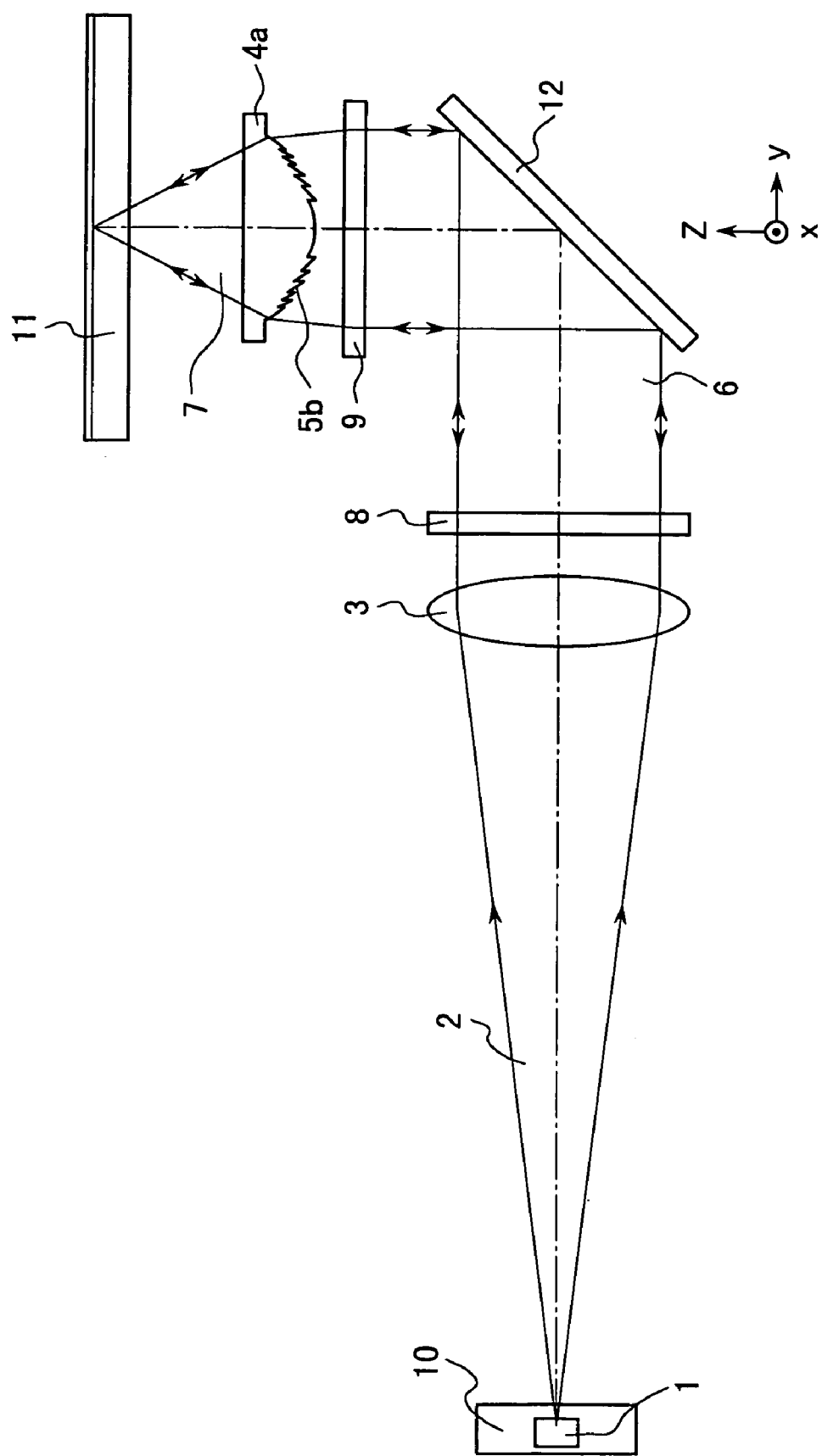
FIG. 7 is a side view showing the basic structure of an optical head according to Embodiment 3 of the present invention and how a light beam is propagated.
Figure 8:
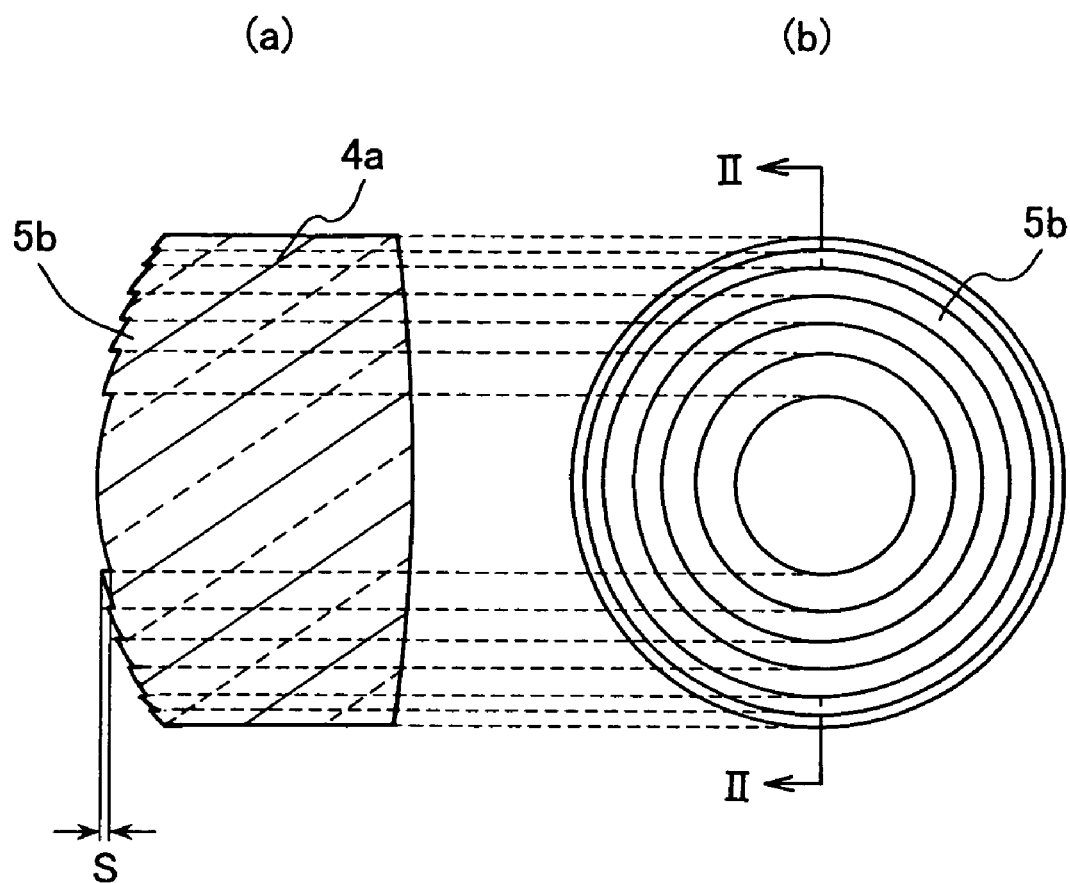
FIG. 8(a) is a cross-sectional view of an objective lens with a defocusing correction element formed in an optical head according to Embodiment 3 of the present invention.
FIG. 8(b) is a plan view of an objective lens with a defocusing correction element formed in an optical head according to Embodiment 3 of the present invention.

Next, an optical head according to Embodiment 3 will be explained with reference to FIGS. 7, 8 by mainly referring to the point that is different from Embodiment 1 described above. FIG. 7 is a side view showing the basic structure of the optical head according to Embodiment 3 and how a light beam is propagated. FIG. 8(b) is a plan view of an objective lens with a defocusing correction element formed according to Embodiment 3, and FIG. 8(a) is a cross-sectional view taken on line II—II of FIG. 8(b).

As illustrated in FIG. 8, a concentric circular pattern is formed on an objective lens 4a. This pattern has, as illustrated in FIG. 8(a), a cross-section substantially of a saw-tooth shape having a step s, and a defocusing correction element 5b is formed by this saw-tooth shape. By integrating the defocusing correction element 5b with the objective lens 4a, the optical head can be miniaturized, and position adjustment also can be simplified.

Here, the step s is formed to satisfy $s=2\lambda/(n-1)$ substantially, where $\lambda$ is a central wavelength of the light source 1 and n is a refractive index of a material for forming the defocusing correction element 5b. When a design wavelength $\lambda$, i. e. a single wavelength $\lambda$ without any wavelength broadening, enters, a phase difference of a light beam corresponding to the step s substantially becomes $2\pi$ (there is substantially phase matching), so that the optical loss hardly occurs as in the case where the step s does not exist (as in the case where the defocusing correction element 5b does not exist), and the light beam is focused excellently by the objective lens 4a.

On the other hand, when an incident wavelength is shifted from the design value, a phase difference in a groove depth of the defocusing correction element 5b is shifted from $2\pi$. Therefore, the defocusing correction element 5b performs a wavefront conversion so that a focal fluctuation of the objective lens 4a (chromatic aberration) which is caused by the wavelength deviation can be extinguished mutually.

In other words, as the wavelength of the parallel beam 6 is elongated, the refractive index of the glass material of the objective lens 4a is reduced, so that the focal distance of the objective lens 4a is elongated. However, as for the defocusing correction element 5b, the phase difference at the step is reduced from $2\pi$, and thus, the emitted beam of the defocusing correction element 5b will be a convergent beam, which practically acts to reduce the focal distance of the objective lens 4a, and as a whole, the fluctuation of the focal distance is extinguished.

In addition, in the present embodiment, for substantially achieving the phase matching at the step of the defocusing correction element 5b, the step s was determined such that the phase difference was $2\pi$, but the phase difference may be determined to be substantially an integral multiple of $2\pi$. In this case, however, the optical loss is larger than in the former case.

EMBODIMENT 4

Figure 9:
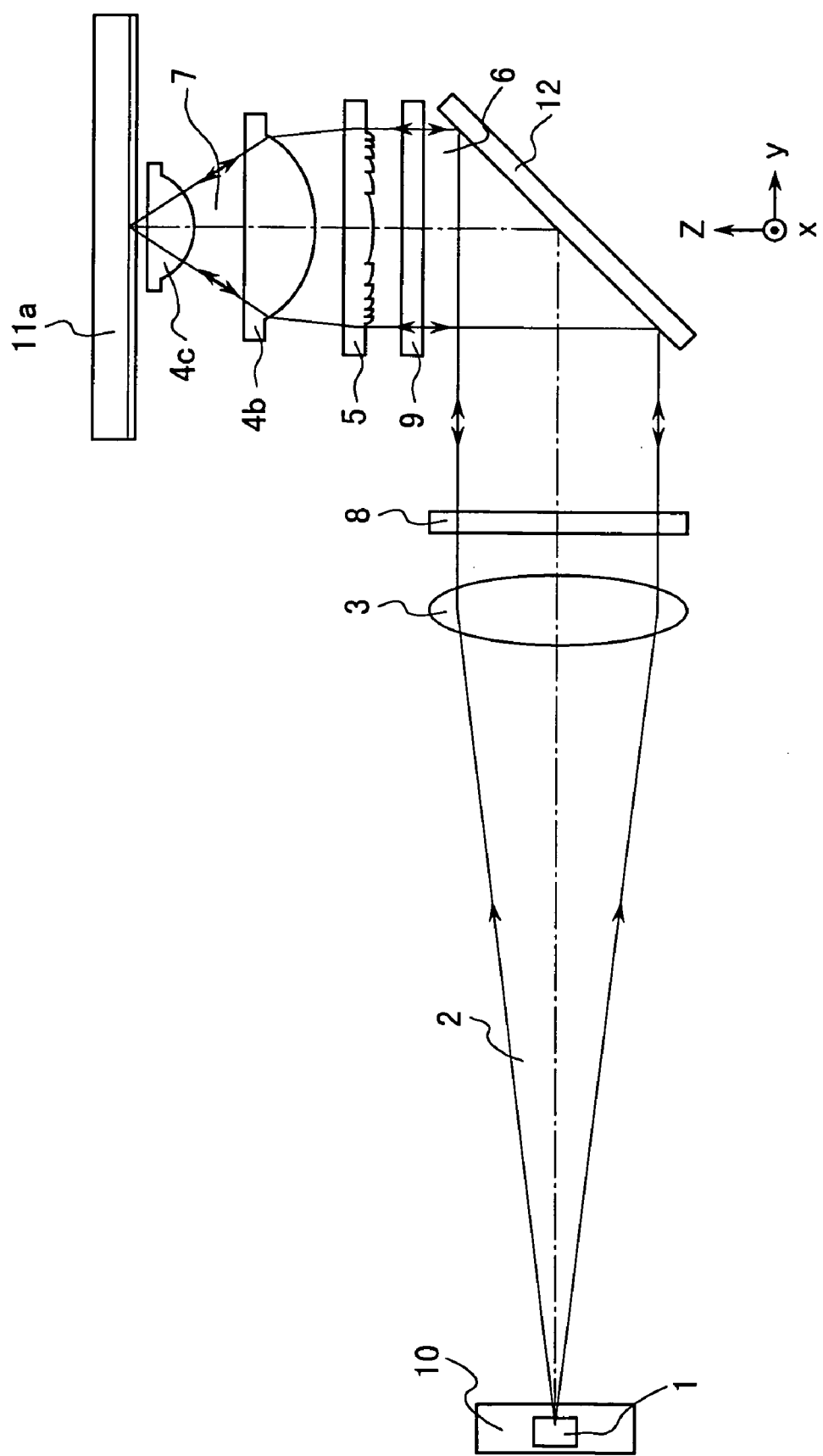
FIG. 9 is a side view showing the basic structure of an optical head according to Embodiment 4 of the present invention and how a light beam is propagated.

Next, an optical head according to Embodiment 4 of the present invention will be explained with reference to FIG. 9 by mainly referring to the point that is different from Embodiment 1 described above. FIG. 9 is a side view showing the basic structure of the optical head according to Embodiment 4 of the present invention and how a light beam is propagated.

In this embodiment, as illustrated in FIG. 9, the objective lens includes two lenses 4b, 4c, and together with the defocusing correction element 5, a total of three lenses form a collective lens, for example, with a high NA of NA0.85. Moreover, the base material thickness (thickness of a protective layer) of the information recording medium 11a was 0.6 mm in the previous embodiments, but the thickness is reduced to 0.1 mm in the present embodiment.

In the present embodiment, the base material is thinner, and the absolute value of the optical path length passing through the base material is smaller, so that the increase of coma aberration caused by the inclination of the information recording medium 11a can be suppressed, and the NA of the objective lens can be increased.

In this embodiment, as in Embodiment 1, both the defocusing correction means 5 and the spherical aberration correction means 9 are provided. Therefore, while the defocusing of a focused spot on the information recording medium 11a caused by the wavelength broadening of the light source and the chromatic aberration of the optical system can be corrected, the spherical aberration of the optical system caused by the wavelength difference between the design wavelength and the incident wavelength also can be corrected substantially.

In this case, when the NA of the objective lens was to be 0.65 or higher, excellent characteristics could not be obtained with the configuration of one objective lens as in Embodiment 1, so that it was necessary to include 2 or more lenses as in this embodiment. Also, as explained in Embodiment 1, defocusing was likely to occur as the NA of the collective lens for focusing the light beam on the information recording medium was higher. The present invention is effective particularly when the NA of the collective lens is 0.55 or higher. The test results showed that, in the case where the NA of the combined collective lens was 0.65 or higher as in the present embodiment, defocusing was more likely to occur. Therefore, the effect of defocusing correction is even more significant when 2 or more objective lenses are combined and the NA of the collective lens is determined to be 0.65 or higher, as in the present embodiment.

Furthermore, when the wavelength is in the range of 0.3 $\mu m \leq \lambda \leq 0.5$ $\mu m$, the occurrence of defocusing is increased even more, and the effect of the defocusing correction is significant as in Embodiment 1.

Figure 10:
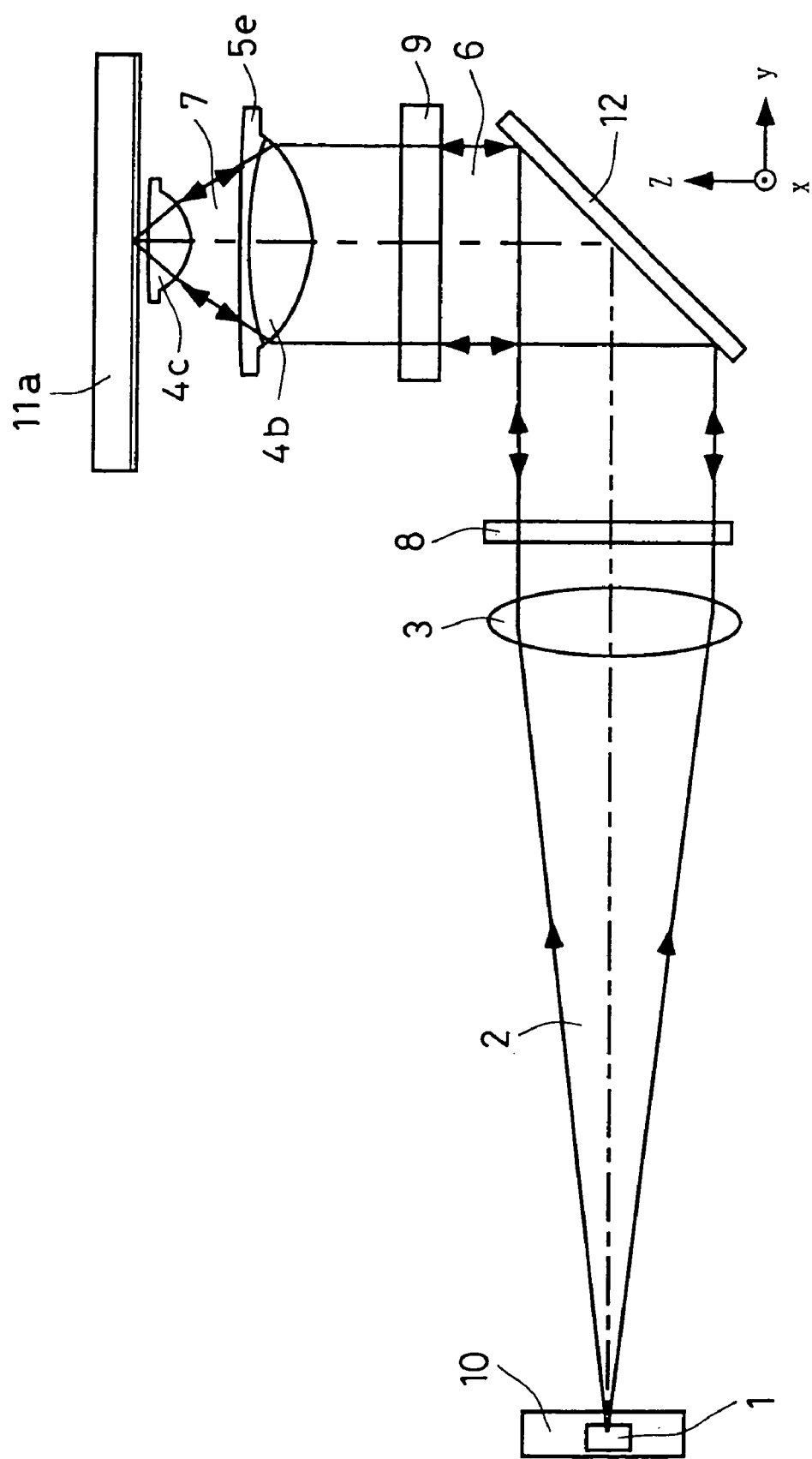
FIG. 10 is a side view showing the basic structure of an optical head in another example of Embodiment 4 of the present invention and how a light beam is propagated.

FIG. 10 is a side view showing the basic structure of an optical head in another example of the present embodiment and how a light beam is propagated. In the embodiment shown in FIG. 9, for preventing defocusing from occurring, the defocusing correction element 5, which is a convex diffractive optical lens having a saw-tooth shaped portion, is used. The embodiment shown in FIG. 10 is configured to eliminate chromatic aberration by combining a concave lens 5e and a convex lens 4b that are both refractive optical elements.

Figure 11:
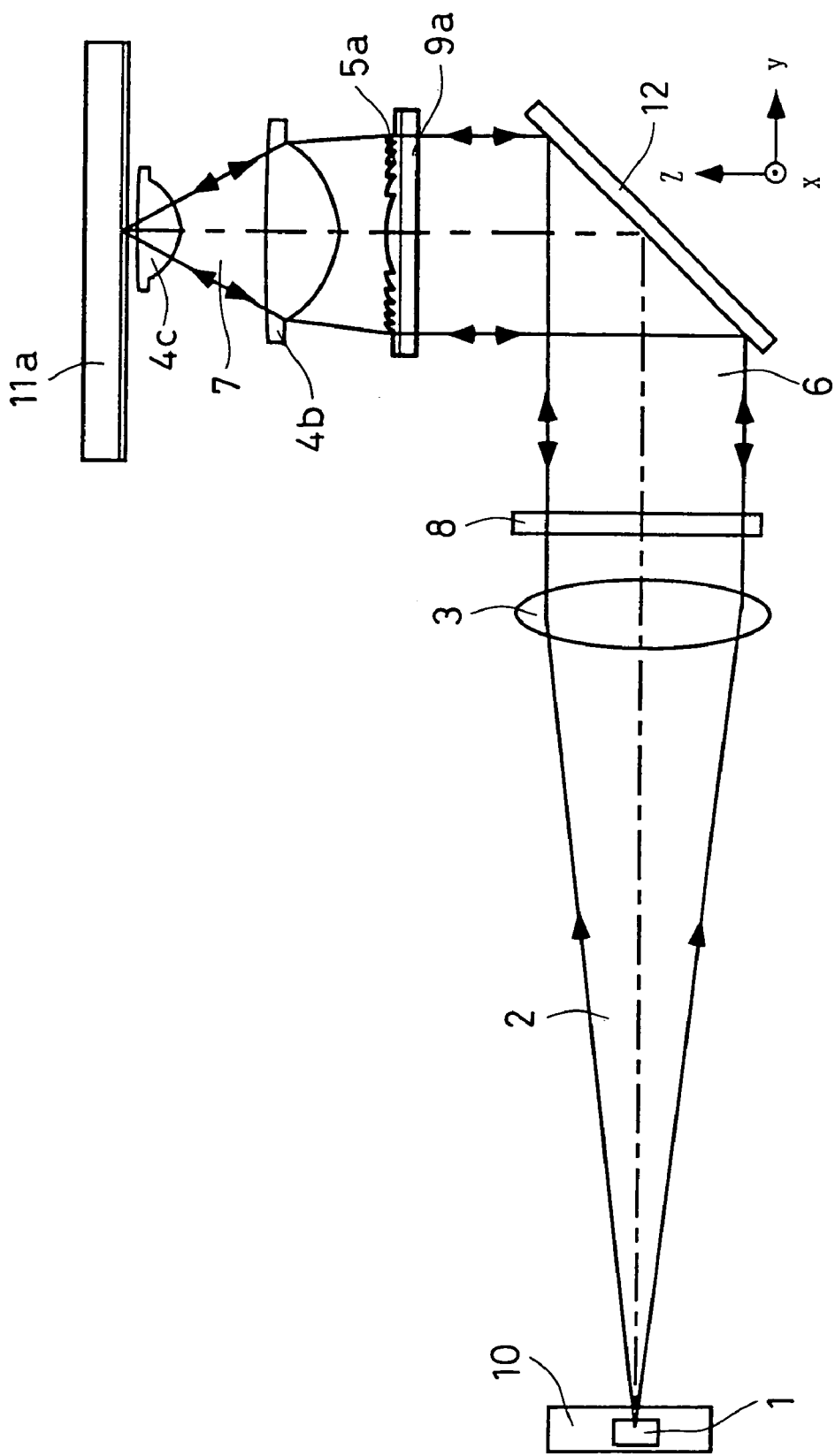
FIG. 11 is a side view showing the basic structure of an optical head in another example of Embodiment 4 of the present invention and how a light beam is propagated.

The configuration of the embodiment illustrated in FIG. 11 is the same with that shown in FIG. 6 except for the configuration of the information recording medium and that of the objective lens. In other words, in the present embodiment, a lens 4c is provided in addition to the objective lens 4b to form a collective lens with a high NA. Furthermore, as with the embodiment shown in FIG. 6, the defocusing correction element 5a is integrated with the spherical aberration correction element 9a, so that the optical head can be miniaturized, and position adjustment also can be simplified.

Figure 12:
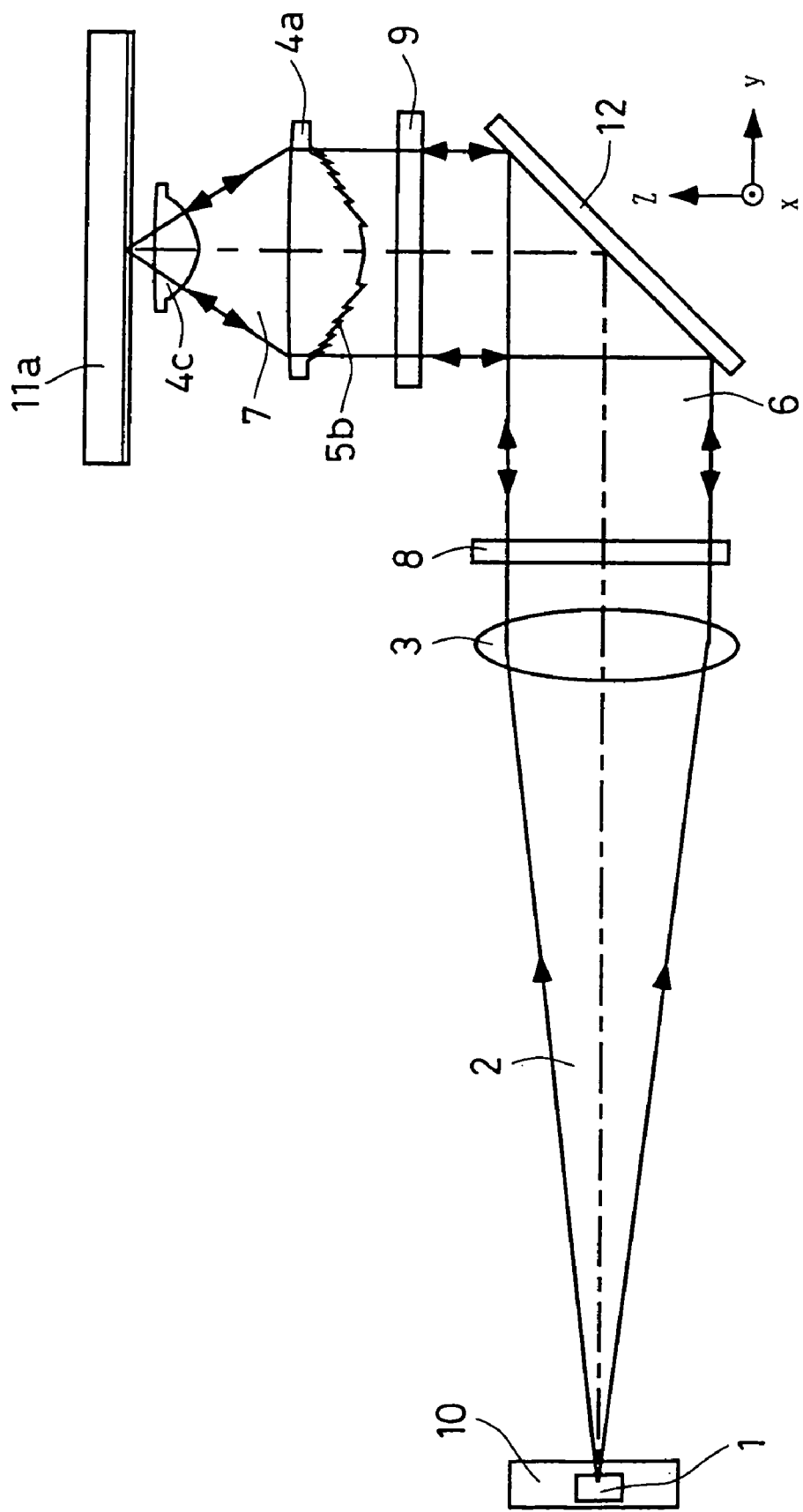
FIG. 12 is a side view showing the basic structure of an optical head in another example of Embodiment 4 of the present invention and how a light beam is propagated.

The configuration of the embodiment illustrated in FIG. 12 is the same with that shown in FIG. 7 except for the configuration of the information recording medium and that of the objective lens. In other words, in the present embodiment, a lens 4c is provided in addition to the objective lens 4a to form a collective lens with a high NA. Furthermore, as with the embodiment shown in FIG. 7, the defocusing correction element 5b is integrated with the objective lens 4a, so that the optical head can be miniaturized, and position adjustment also can be simplified.

EMBODIMENT 5

Figure 13:
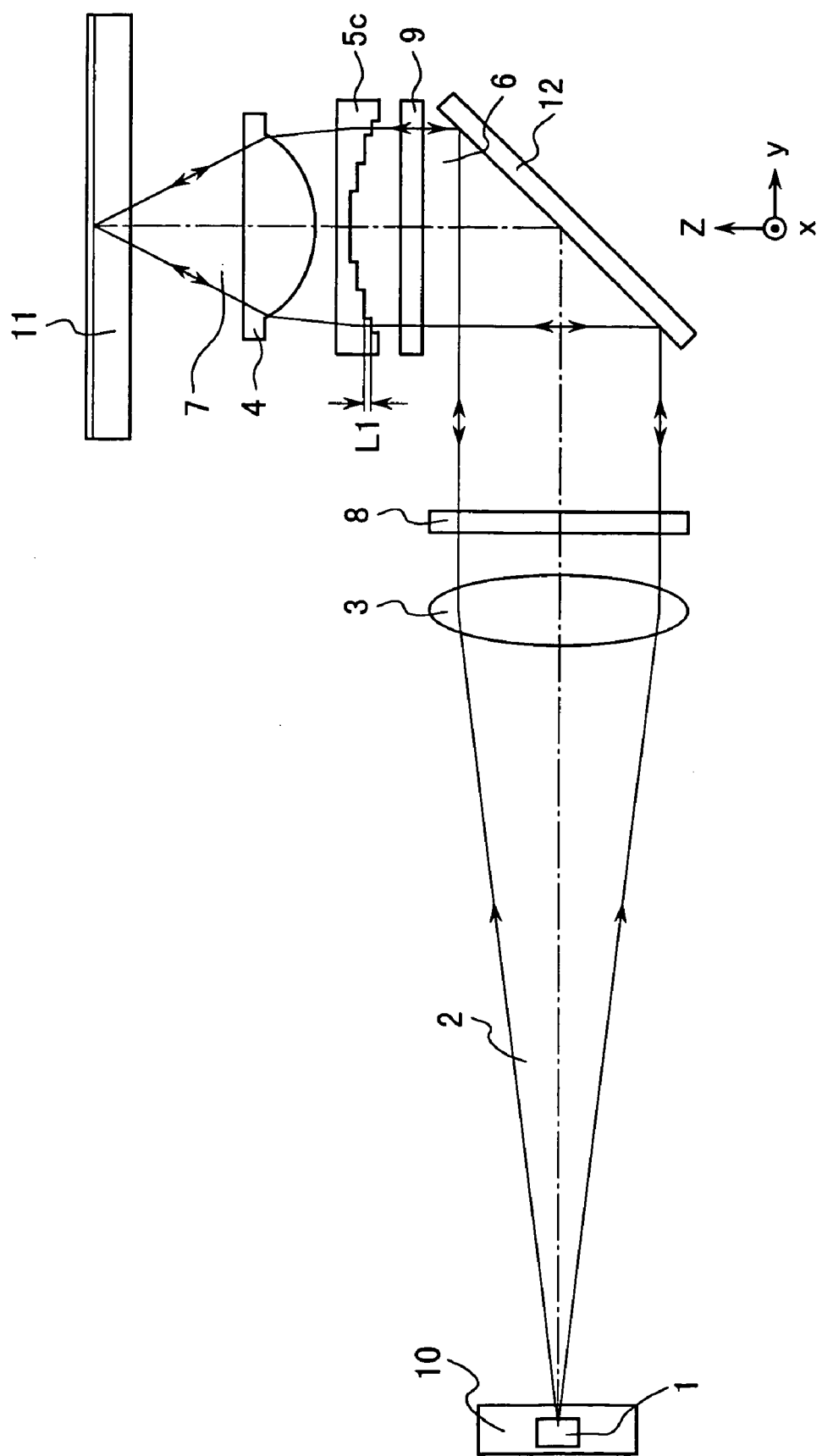
FIG. 13 is a side view showing the basic structure of an optical head according to Embodiment 5 of the present invention and how a light beam is propagated.

Next, an optical head according to Embodiment 5 will be explained with reference to FIG. 13 by mainly referring to the point that is different from Embodiment 1 described above. FIG. 13 is a side view showing the basic structure of the optical head according to Embodiment 5 of the present invention and how a light beam is propagated.

In the present embodiment, as a defocusing correction element 5c, an afocal optical element having staircase steps with a step size L1 is used, and the step size L1 substantially satisfies L1=m λ/(n−1), where λ is a wavelength, n is a refractive index of a material of the aforementioned optical element and m is an arbitrary integer.

The defocusing correction element 5c has a typical pattern of a diffraction-type lens in which the period is reduced gradually towards the periphery. As illustrated in FIG. 13, the cross-section of the defocusing correction element 5c has a staircase shape, and with regard to the step size L1 of this staircase shape, when a design wavelength enters, a phase difference of the light against the step L1 substantially becomes an integral multiple of 2π. Therefore, in case of the design wavelength, the state is equivalent to that without any element (this is the reason for calling it an afocal optical element), and the substantially parallel beam 6 with the design wavelength passes through as it is.

However, in the case where the wavelength is changed from the design wavelength, the phase difference is shifted. Therefore, as in Embodiments 3 and 4, the parallel beam is changed to either a divergent beam or a convergent beam, which serves to extinguish the focal fluctuation generated in the objective lens 4.

Figure 14:
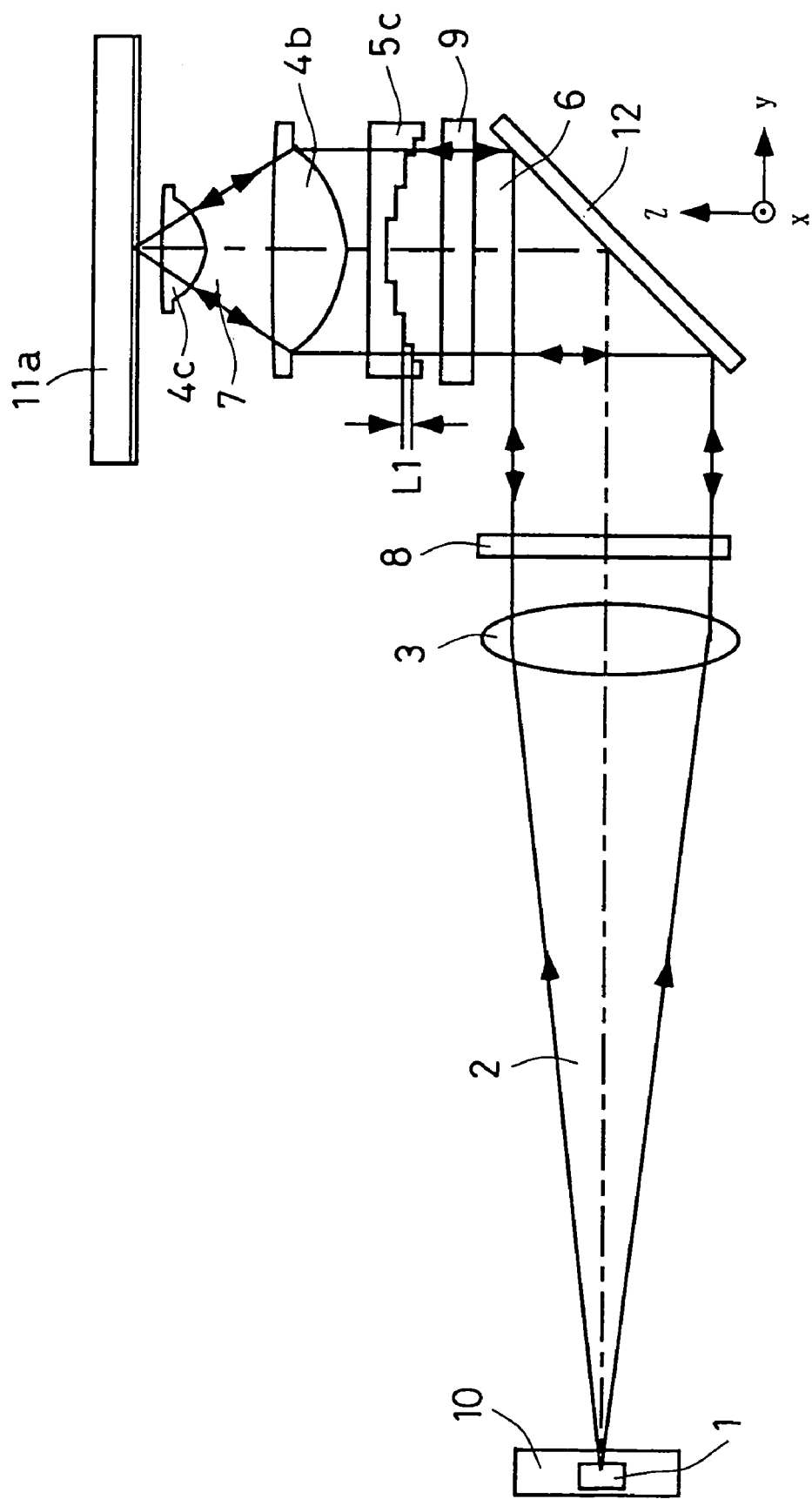
FIG. 14 is a side view showing the basic structure of an optical head in another example of Embodiment 5 of the present invention and how a light beam is propagated.

FIG. 14 is a side view showing the basic structure of an optical head in another example of the present embodiment and how a light beam is propagated. The configuration of the embodiment illustrated in FIG. 14 is the same as that shown in FIG. 13 except for the configuration of the information recording medium and that of the objective lens. In other words, in the present embodiment, the objective lens includes two lenses 4b, 4c to form a collective lens with a high NA. Moreover, as with the embodiment shown in FIG. 13, the defocusing correction lens 5c is provided, and when the wavelength is changed from the design wavelength, the focal fluctuation generated in the objective lens can be extinguished.

In addition, the defocusing correction element 5c may be positioned, as illustrated in FIGS. 13, 14, in the optical path between the information recording medium 11 and the mirror 12, but it is also possible to position the defocusing correction element 5c in the optical path between the light source 1 and the mirror 12.

EMBODIMENT 6

Figure 15:
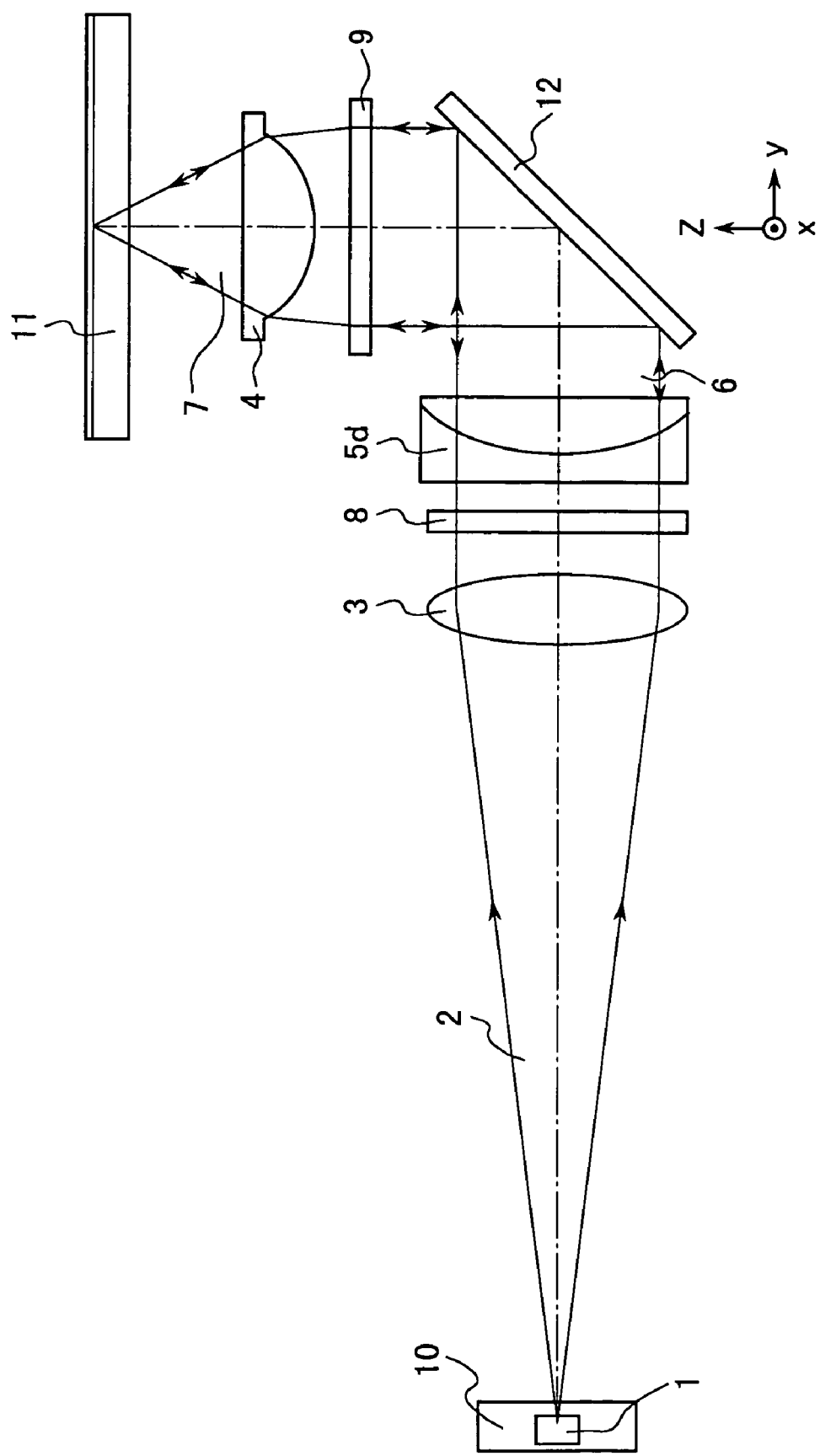
FIG. 15 is a side view showing the basic structure of an optical head according to Embodiment 6 of the present invention and how a light beam is propagated.

Next, an optical head according to Embodiment 6 will be explained with reference to FIG. 15 by mainly referring to the point that is different from Embodiment 1 described above. FIG. 15 is a side view showing the basic structure of the optical head according to Embodiment 6 and how a light beam is propagated.

In the present embodiment, as a defocusing correction element 5d, an afocal optical element is used, in which a convex lens and a concave lens made of glass materials with different Abbe numbers are combined (however, a refractive index of the glass material is substantially the same when an incident wavelength is a design wavelength). The principle of this element is the same as the afocal optical element explained in Embodiment 5. By using the combined lens of convex and concave types that are both refractive optical elements, the effect of a smaller optical loss can be obtained.

Figure 16:
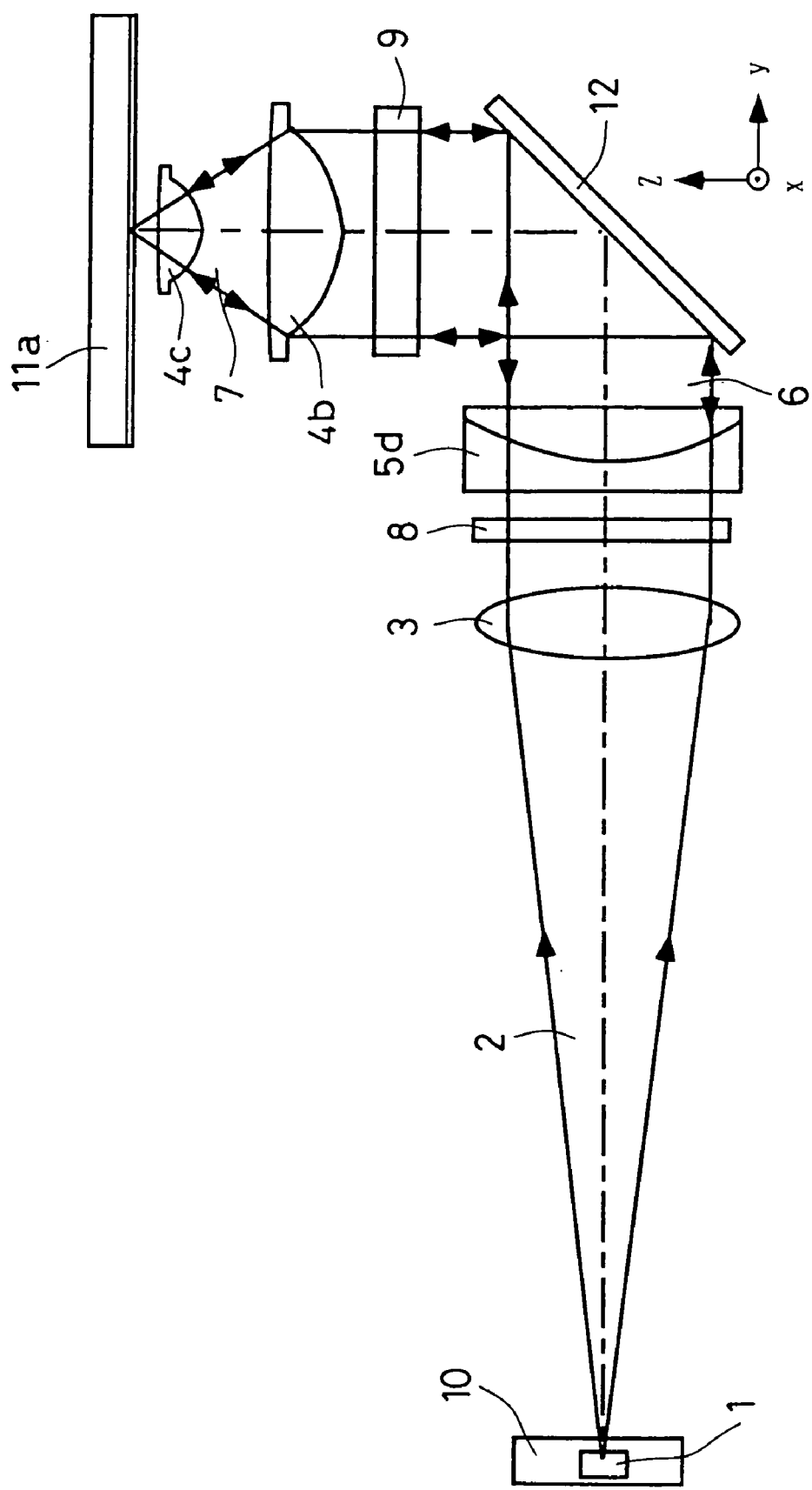
FIG. 16 is a side view showing the basic structure of an optical head according to Embodiment 6 of the present invention and how a light beam is propagated.

FIG. 16 is a side view showing the basic structure of an optical head in another example of the present embodiment and how a light beam is propagated. The configuration of the embodiment illustrated in FIG. 16 is the same as that shown in FIG. 15 except for the configuration of the information recording medium and that of the objective lens. In other words, in the present embodiment, the objective lens includes two lenses 4b, 4c to form a collective lens with a high NA. Moreover, as with the embodiment shown in FIG. 15, the defocusing correction element 5d formed by the combined lens of convex and concave types is provided, and the effect of a smaller optical loss can be obtained.

The defocusing correction element 5d is positioned in the optical path between the light source 1 and the mirror 12 in the examples of FIGS. 15, 16, but the defocusing correction element 5d may be positioned in the optical path between the information recording medium 11 and the mirror 12. When the defocusing correction element 5d is positioned in the optical path between the light source 1 and the mirror 12, the effect of reducing the height to form a thinner optical head can be obtained.

EMBODIMENT 7

Figure 17:
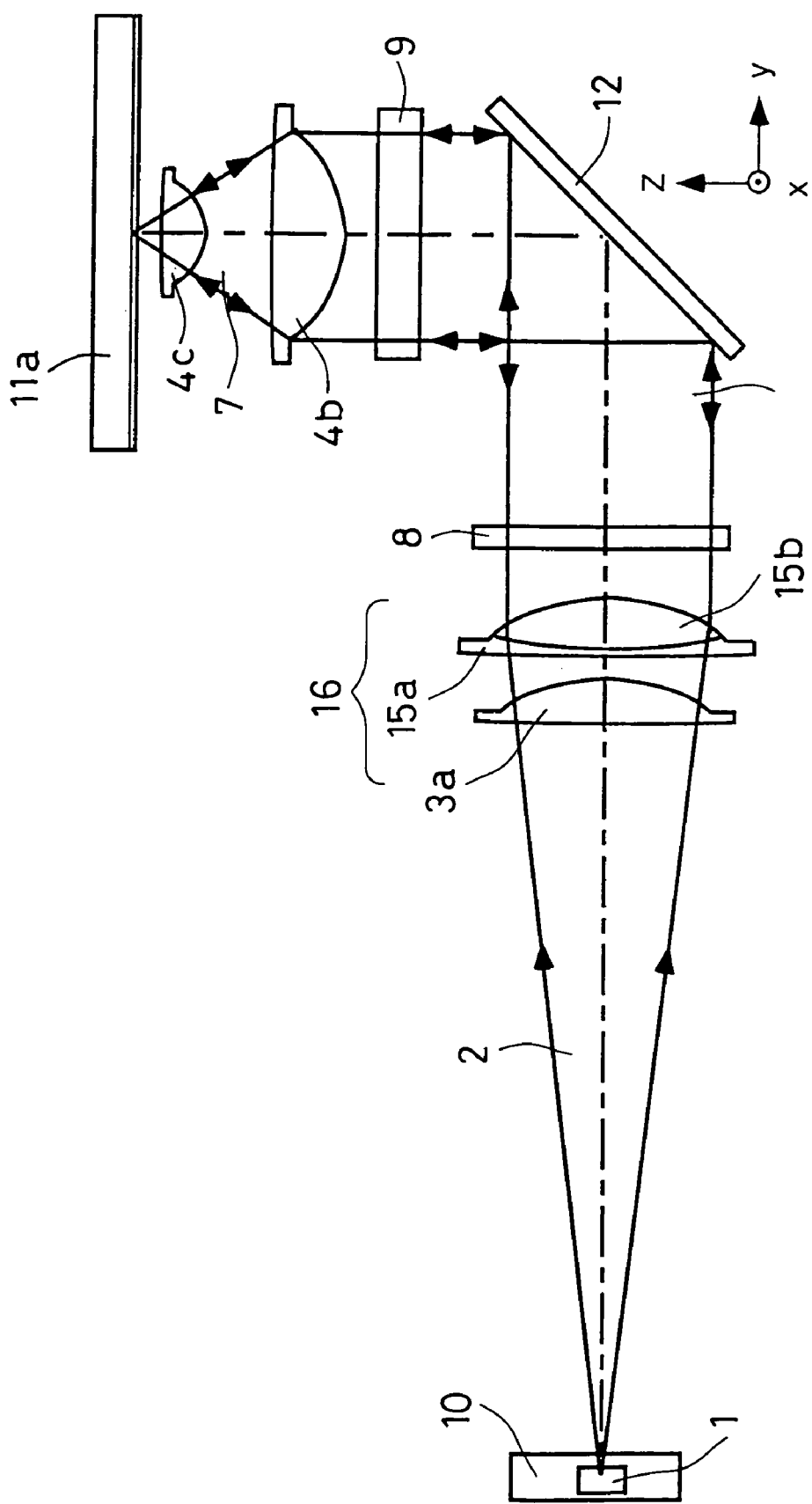
FIG. 17 is a side view showing the basic structure of an optical head according to Embodiment 7 of the present invention and how a light beam is propagated.

Next, an optical head according to Embodiment 7 will be explained with reference to FIGS. 17, 18 by mainly referring to the point that is different from Embodiment 1 described above. FIG. 17 is a side view showing the basic structure of the optical head according to Embodiment 7 of the present invention and how a light beam is propagated.

In the example shown in FIG. 17, in the optical path between the focus/tracking error signal detecting element 8 and the light source 1, a lens 3a and a combined lens of a concave lens 15a and a convex lens 15b are arranged in series to form a lens group 16. The lens group 16 not only serves to correct chromatic aberration but also acts as a collimator lens.

According to the present embodiment, the lens group 16 can substantially correct the chromatic aberration not only of the objective lenses 4b, 4c but also of the entire optical system including the collimator lens 3. Therefore, it is unnecessary to provide separate correction means of chromatic aberration for the objective lenses 4b, 4c. As a result, the configuration of the objective lens can be simplified, and an optical head that is thinner in the height direction can be obtained.

Figure 18:
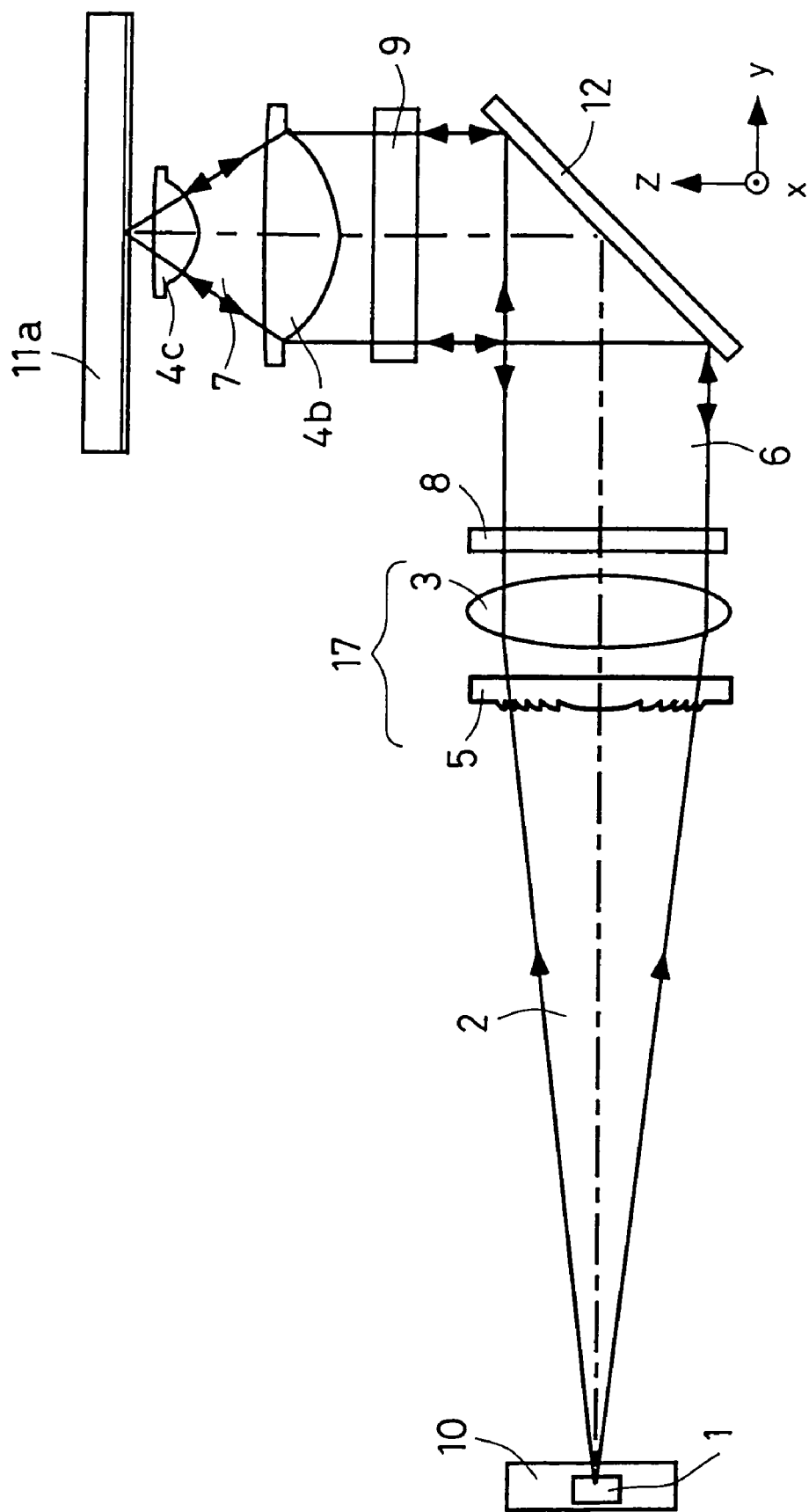
FIG. 18 is a side view showing the basic structure of an optical head in another example of Embodiment 7 of the present invention and how a light beam is propagated.

FIG. 18 is a side view showing the basic structure of an optical head in another example of the present embodiment and how a light beam is propagated. In the example shown in FIG. 18, in the optical path between the focus/tracking error signal detecting element 8 and the light source 1, the lens 3 and the defocusing correction element 5 are arranged in series to form a lens group 17. Also in the example shown in FIG. 18, as in the example shown in FIG. 17, the lens group 17 not only serves to correct chromatic aberration but also acts as a collimator lens.

According to the present embodiment, the lens group 17 can substantially correct the chromatic aberration not only of the objective lenses 4b, 4c but also of the entire optical system including the collimator lens 3. Therefore, it is unnecessary to provide separate correction means of chromatic aberration for the objective lenses 4b, 4c. As a result, the configuration of the objective lens can be simplified, and an optical head that is thinner in the height direction can be obtained.

The optical heads of the present invention have been explained by referring to Embodiments 1 to 7 above, but the present invention is not limited to these embodiments. Optical heads, in which the configurations of the optical heads in each of the embodiments are combined, also are included in the present invention, and the same effects as described above can be achieved.

In addition, the objective lens and the collimator lens used in the above embodiments are named such for convenience, and they are the same as those generally called lenses.

Furthermore, in the embodiments described above, the optical disc was used as an example of the information recording medium, but the present invention also can be applied to card-shaped, drum-shaped, or tape-shaped products that are designed to reproduce media with a plurality of different specifications such as thickness, recording density etc. by using the same kind of information recording/reproduction device.

As described above, excellent optical characteristics can be obtained in the present invention according to the configuration in which both the defocusing correction means and the spherical aberration correction means are provided, and thus, while the defocusing of a focused spot on the information recording medium caused by the wavelength broadening of the light source and the chromatic aberration of the optical system can be corrected, the spherical aberration of the optical system caused by the wavelength difference between the design wavelength and the incident wavelength also can be corrected, and furthermore, if necessary, the spherical aberration caused by an error in the standard thickness of the base material of the information recording medium can be corrected.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical head comprising a light source, an objective lens for focusing a light beam emitted from the light source on an information recording medium and a photodetector for detecting the light beam reflected from the information recording medium, wherein defocusing correction means for correcting a defocused state caused by a wavelength change and a wavelength broadening and spherical aberration correction means as a separate element from the defocusing correction means are provided in an optical path between the light source and the information recording medium, and the spherical aberration correction means substantially corrects a spherical aberration occurring due to the defocusing correction means in accordance with an amount of the spherical aberration.

2. The optical head according to claim 1, wherein the light source has a wavelength broadening in which a full width at half maximum of a wavelength is substantially 0.3 nm or more.

3. The optical head according to claim 2, wherein the wavelength $\lambda$ of the emitted light beam satisfies a relationship of 0.3 $\mu m \leq \lambda \leq 0.5$ $\mu m$.

4. The optical head according to claim 1, wherein the defocusing correction means substantially corrects defocusing of a focused spot on the information recording medium caused by chromatic aberration of the objective lens.

5. The optical head according to claim 1, further comprising a collimator lens positioned between the light source and the objective lens in an optical path for substantially collimating the light beam emitted from the light source, wherein the defocusing correction means substantially corrects defocusing of a focused spot on the information recording medium caused by a wavelength broadening of the light source and chromatic aberration of an optical system including the objective lens and the collimator lens.

6. The optical head according to claim 5, wherein a lens group comprising the defocusing correction means and the collimator lens substantially collimating the light beam emitted from the light source and substantially correct the defocusing.

7. The optical head according to claim 1, wherein the defocusing correction means is a diffractive optical element.

8. The optical head according to claim 7, wherein the diffractive optical element is a convex diffractive optical lens.

9. The optical head according to claim 1, wherein the defocusing correction means is an afocal optical element.

10. The optical head according to claim 9, wherein the afacal optical element has staircase steps with a step size L1, and the step size L1 substantially satisfies $L1 = m\lambda/(n-1t)$, where $\lambda$ is a wavelength, n is a refractive index of a material of the optical clement and m is an arbitrary integer.

11. The optical head according to claim 9, wherein the afocal optical element is a combined lens of convex and concave types.

12. The optical head according to claim 1, wherein the defocusing correction means is a combined lens of concave and convex types that are both refractive optical elements.

13. The optical head according to claim 1, wherein the spherical aberration correction means substantially corrects the spherical aberration of the objective lens and the defocusing correction means caused by wavelength difference between a design wavelength and an incident wavelength.

14. The optical bead according to claim 13, wherein the spherical aberration correction means further substantially corrects spherical aberration caused by an error in a standard thickness of a base material of the information recording medium.

15. The optical head according to claim 1, further comprising a collimator lens positioned between the light source and the objective lens in an optical path for substantially collimating the light beam emitted from the light source, and wherein the spherical aberration correction means substantially corrects spherical aberration of the optical system including the objective lens and the collimator lens and the defocusing correction means caused by wavelength difference between a design wavelength and an incident wavelength.

16. The optical head according to claim 15, wherein the spherical aberration correction means further substantially corrects spherical aberration caused by an error in a standard thickness of a base material of the information recording medium.

17. The optical head according to claim 1, wherein the spherical aberration correction means substantially corrects spherical aberration caused by an error in a standard thickness of a base material of the information recording medium.

18. The optical head according to claim 1, wherein the spherical aberration correction means is made of a liquid crystal element in which a refractive index distribution is changeable.

19. The optical head according to claim 18, wherein the liquid crystal element has 4 or more segmented areas electrically divided in the radial direction.

20. The optical head according to claim 1, wherein a numerical aperture of a collective lens for focusing a light beam on the information recording medium is shared between the objective lens and the defocusing correction means.

21. The optical head according to claim 20, wherein the defocusing correction means is a convex diffractive optical lens, and a numerical aperture of the objective lens is in the range between 8 times to 20 times higher than a numerical aperture of the diffractive optical lens.

22. The optical head according to claim 20, wherein the objective lens includes 2 or more lenses.

23. The optical head according to claim 1, wherein a numerical aperture of the objective lens is 0.55 or higher.

24. The optical head according to claim 1, wherein the objective lens includes 2 or more lenses, and the numerical aperture thereof is 0.65 or higher.

25. The optical head according to claim 1, wherein the defocusing correction means and the spherical aberration correction means are integrated.

26. The optical head according to claim 1, wherein at least one selected from the defocusing correction means and the spherical aberration correction means is driven integrally with the objective lens by an actuator.

* * * * *

UNITED STATES PATENT AND TRADEMARK OFFICE
CERTIFICATE OF CORRECTION

PATENT NO. : 7,085,203 B2
APPLICATION NO. : 09/794434
DATED : August 1, 2006
INVENTOR(S) : Shiono et al.

It is certified that error appears in the above-identified patent and that said Letters Patent is hereby corrected as shown below:

Column 16, line 25(claim 10): "afacal" should read --afocal--
Column 16, line 26(claim 10): "(n-1t)" should read --(n-1)--
Column 16, line 40(claim 14): "bead" should read --head--

Signed and Sealed this

Sixteenth Day of January, 2007

JON W. DUDAS
*Director of the United States Patent and Trademark Office*